United States Patent
Beall et al.

(10) Patent No.: US 11,964,907 B2
(45) Date of Patent: Apr. 23, 2024

(54) GLASSES AND GLASS-CERAMICS, AND METHOD OF MAKING THE SAME

(71) Applicant: CORNING INCORPORATED, Corning, NY (US)

(72) Inventors: George Halsey Beall, Big Flats, NY (US); John Philip Finkeldey, Elkland, PA (US); Charlene Marie Smith, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 18/113,198

(22) Filed: Feb. 23, 2023

(65) Prior Publication Data

US 2023/0257293 A1 Aug. 17, 2023

Related U.S. Application Data

(63) Continuation of application No. PCT/US2023/012904, filed on Feb. 13, 2023, which is a continuation-in-part of application No. 17/887,012, filed on Aug. 12, 2022, now Pat. No. 11,753,331.

(60) Provisional application No. 63/309,667, filed on Feb. 14, 2022, provisional application No. 63/444,715, filed on Feb. 10, 2023.

(51) Int. Cl.
*C03C 3/087* (2006.01)
*C03C 3/097* (2006.01)

(52) U.S. Cl.
CPC .............. *C03C 3/087* (2013.01); *C03C 3/097* (2013.01)

(58) Field of Classification Search
CPC .......... C03C 3/087; C03C 3/097; C03C 3/095
See application file for complete search history.

(56) References Cited

U.S. PATENT DOCUMENTS

| | | |
|---|---|---|
| 2005/0008051 A1 | 1/2005 | Sumida |
| 2014/0141285 A1 | 5/2014 | Momono et al. |
| 2015/0018194 A1 | 1/2015 | Li et al. |
| 2016/0039709 A1 | 2/2016 | Yamamoto et al. |
| 2016/0102010 A1 | 4/2016 | Beall et al. |
| 2018/0099901 A1 | 4/2018 | Beally et al. |

(Continued)

FOREIGN PATENT DOCUMENTS

WO 2019/108823 A1 6/2019

OTHER PUBLICATIONS

Harris, et al., "A New Tetragonal Silicate Mineral Occurring as Inclusions in Lower-Mantle Diamonds", Ature, vol. 387, 1997, pp. 486-488.

(Continued)

*Primary Examiner* — Bryan D. Ripa
*Assistant Examiner* — Cameron K Miller
(74) *Attorney, Agent, or Firm* — Russell S. Magaziner

(57) ABSTRACT

Glass compositions include one or more of silica ($SiO_2$), magnesia (MgO) and alumina ($Al_2O_3$) as essential components and may optionally include sodium oxide ($Na_2O$), potassium oxide ($K_2O$), zirconia ($ZrO_2$), titania ($TiO_2$), zinc oxide (ZnO), manganese oxide ($MnO_2$), hafnium oxide ($HfO_2$) and other components. The glasses may be characterized by low density at room temperature.

15 Claims, 2 Drawing Sheets

(56) References Cited

U.S. PATENT DOCUMENTS

| | | |
|---|---|---|
| 2019/0161397 A1 | 5/2019 | Beall et al. |
| 2021/0130225 A1 | 5/2021 | Beall et al. |
| 2022/0002189 A1 | 1/2022 | Furuta et al. |
| 2022/0277768 A1* | 9/2022 | Sato ................... C03C 3/093 |

OTHER PUBLICATIONS

M. Gunter, et al., Jeffbenite (Mg3Al2Si3O12), in Handbook Of Mineralogy, 2016-2017.

Nestola, et al., "Tetragonal Almandine-Pyrope Phase, Tapp: Finally a Name for It, The New Mineral Jeffbenite", Mineralogical Magazine, vol. 80, Issue 7, 2016 pp. 1219-1232.

Smyth, et al., "Ferromagnesian Jeffbenite Synthesized at 15 Gpa and 1200° C."; American Mineralogist, vol. 107 No. 3, pp. 405-412.

Wang, et al., "High-Pressure Crystal Structure and Equation of State of Ferromagnesian Jeffbenite: Implications for Stability in the Transition Zone and Uppermost Lower Mantle", Contributions to Mineralogy and Petrology, vol. 176 No. 93, 2021.

Nestola Fabrizio et al., "Mg3Al2Si3O12 Jeffbenite Inclusion In Super-Deep Diamonds Is Thermodynamically Stable at Very Shallow Earth's depths", Scientific Reports, vol. 13, No. 1, Jan. 2023, 10 pages.

Smyth Jr et al: "Ferromagnesian Jeffbenite Synthesized At 15 Gpa And 1200 OC" American Mineralogist, Washington, DC, US, vol. 107, No. 3, Mar. 2022, 33 pages.

Inaba S. et al., "Empirical Equation for Calculating the Density of Oxide Glasses", Journal of the American Ceramic Society, 2009, vol. 93, issue 1, pp. 217-220.

International Search Report and Written Opinion of the International Searching Authority; PCT/US2023/012904; dated May 16, 2023; 11 pages; US Patent Office.

\* cited by examiner

GLASSES AND GLASS-CERAMICS, AND METHOD OF MAKING THE SAME

CROSS-REFERENCE TO RELATED APPLICATIONS

This Application is a continuation of International Application No. PCT/US23/12904 filed Feb. 13, 2023, which is a continuation-in-part of U.S. application Ser. No. 17/887,012 filed Aug. 12, 2022 and claims the priority benefit of U.S. Application Nos. 63/309,667 filed Feb. 14, 2022 and 63/444,715 filed Feb. 10, 2023, each of which is incorporated by reference herein in its entirety.

FIELD

The present specification relates to glasses and glass-ceramic articles made therefrom, including methods of making the glasses and glass-ceramics.

BACKGROUND

Glass articles, such as cover glasses, glass backplanes, housings, and the like, are employed in both consumer and commercial electronic devices, such as smart phones, tablets, portable media players, personal computers, and cameras. The mobile nature of these portable devices makes the devices and the glass articles included therein particularly vulnerable to accidental drops on hard surfaces, such as the ground. Moreover, glass articles, such as cover glasses, may include "touch" functionality, which necessitates that the glass article be contacted by various objects including a user's fingers and/or stylus devices. Accordingly, the glass articles must be sufficiently robust to endure accidental dropping and regular contact without damage, such as scratching. Indeed, scratches introduced into the surface of the glass article may reduce the strength of the glass article as the scratches may serve as initiation points for cracks leading to catastrophic failure of the glass.

Accordingly, a need exists for alternative materials that have improved mechanical properties relative to glass.

SUMMARY

According to an aspect of the present disclosure, a glass comprises a plurality of components, the glass having a composition of the components comprising greater than or equal to 36.0 mol. % and less than or equal to 75.0 mol. % $SiO_2$, greater than or equal to 13.0 mol. % and less than or equal to 50.0 mol. % MgO, greater than or equal to 2.0 mol. % and less than or equal to 12.1 mol. % $Al_2O_3$, greater than or equal to 0.0 mol. % and less than or equal to 7.0 mol. % $Y_2O_3$, greater than or equal to 0 mol. % and less than or equal to 4.65 mol. % $TiO_2$, greater than or equal to 0.0 mol. % and less than or equal to 2.0 mol. % $Ta_2O_5$, greater than or equal to 0 mol. % and less than or equal to 0.45 mol. % $P_2O_5$, greater than or equal to 0.0 at. % (atom percent, or atomic percentage) and less than or equal to 1.0 at. % F, a sum of $ZrO_2+HfO_2+TiO_2$ is greater than or equal to 1.5 mol. % and less than or equal to 9.0 mol. % and may optionally contain one or more of monovalent metal oxides $R_2O$ and divalent metal oxides RO, wherein the composition of the components is substantially free of $B_2O_3$, and wherein the composition of the components satisfies the conditions: $R_2O—Al_2O_3$ [mol. %]≤9.0, $SiO_2—Al_2O_3—R_2O$ [mol. %]≤38.5 and MgO/RO [mol. %]≥0.72, where chemical formulas mean the content of corresponding components in the glass, $R_2O$ is a total sum of monovalent metal oxides, and RO is a total sum of divalent metal oxides.

According to another aspect of the present disclosure, a glass comprises a plurality of components, the glass having a composition of the components comprising greater than or equal to 25.0 mol. % and less than or equal to 75.0 mol. % $SiO_2$, greater than or equal to 7.4 mol. % and less than or equal to 14.1 mol. % $Al_2O_3$, greater than or equal to 0.0 mol. % and less than or equal to 10.0 mol. % $Na_2O$, greater than or equal to 0.0 mol. % and less than or equal to 7.0 mol. % $Y_2O_3$, greater than or equal to 0 mol. % and less than or equal to 4.95 mol. % $TiO_2$, greater than or equal to 0.0 mol. % and less than or equal to 4.0 mol. % $B_2O_3$, greater than or equal to 0.0 mol. % and less than or equal to 3.5 mol. % $Li_2O$, greater than or equal to 5.0 mol. % and less than or equal to 55.0 mol. % RO, a sum of $ZrO_2+HfO_2$ is greater than or equal to 1.5 mol. % and less than or equal to 9.5 mol. % and may optionally contain monovalent metal oxides $R_2O$, wherein the composition of the components is substantially free of fluorine, and wherein the composition of the components satisfies the conditions: $R_2O—Al_2O_3$ [mol. %]≤3.0, $SiO_2—Al_2O_3—R_2O$ [mol. %]≤43.6 and MgO/RO [mol. %]≥0.71, where chemical formulas mean the content of corresponding components in the glass, RO is a total sum of divalent metal oxides, and $R_2O$ is a total sum of monovalent metal oxides.

According to one more aspect of the present disclosure, a glass comprises a plurality of components, the glass having a composition of the components comprising greater than or equal to 20.0 mol. % and less than or equal to 80.0 mol. % $SiO_2$, greater than or equal to 13.0 mol. % and less than or equal to 50.0 mol. % MgO, greater than or equal to 0.5 mol. % and less than or equal to 12.1 mol. % $Al_2O_3$, greater than or equal to 0.0 mol. % and less than or equal to 18.0 mol. % $FeO+2*Fe_2O_3$, greater than or equal to 0.0 mol. % and less than or equal to 7.0 mol. % $Li_2O$, greater than or equal to 0.0 mol. % and less than or equal to 5.5 mol. % $TiO_2$, greater than or equal to 0.0 mol. % and less than or equal to 0.9 mol. % $B_2O_3$, greater than or equal to 0.0 at. % and less than or equal to 1.0 at. % F, a sum of $ZrO_2+HfO_2+TiO_2$ is greater than or equal to 1.5 mol. %, a sum of $Na_2O+K_2O$ is greater than or equal to 0.0 mol. % and less than or equal to 18.0 mol. % and may optionally contain one or more components selected from monovalent metal oxides $R_2O$, divalent metal oxides RO, $MnO_2$, $P_2O_5$, $La_2O_3$ and $Y_2O_3$, wherein the composition of the components satisfies the conditions: $SiO_2—Al_2O_3—R_2O$ [mol. %]≤38.5 and MgO/RO [mol. %]≥0.725, and the glass satisfies the condition: $P_d$-(3.38-0.016*($SiO_2—Al_2O_3—R_2O$))<0.000, where $P_d$ is predicted value of density at room temperature, $d_{RT}$ [g/cm³], calculated from the glass composition in terms of mol. % of the components according to the Formula (II):

$$P_d = 2.887 - 0.0072823*SiO_2 + 0.0051002*MgO - 0.0018062*Al_2O_3 + 0.025136*ZrO_2 - 0.0014332*K_2O + 0.0092523*TiO_2 + 0.020819*ZnO + 0.036644*BaO + 0.017682*FeO + 0.0071329*MnO + 0.0091327*MnO_2 + 0.011077*CaO + 0.024475*SrO + 0.044972*Cs_2O + 0.00053066*Li_2O - 0.012312*P_2O_5 + 0.083043*La_2O_3 - 0.0074883*B_2O_3 + 0.059360*Y_2O_3 + 0.069507*PbO + 0.056896*HfO_2, \quad (II)$$

where chemical formulas mean the content of corresponding components in the glass, $R_2O$ is a total sum of monovalent metal oxides, RO is a total sum of divalent metal oxides, and an asterisk (*) means multiplication.

These and other aspects, objects, and features of the present disclosure will be understood and appreciated by

DETAILED DESCRIPTION

Figure 1:
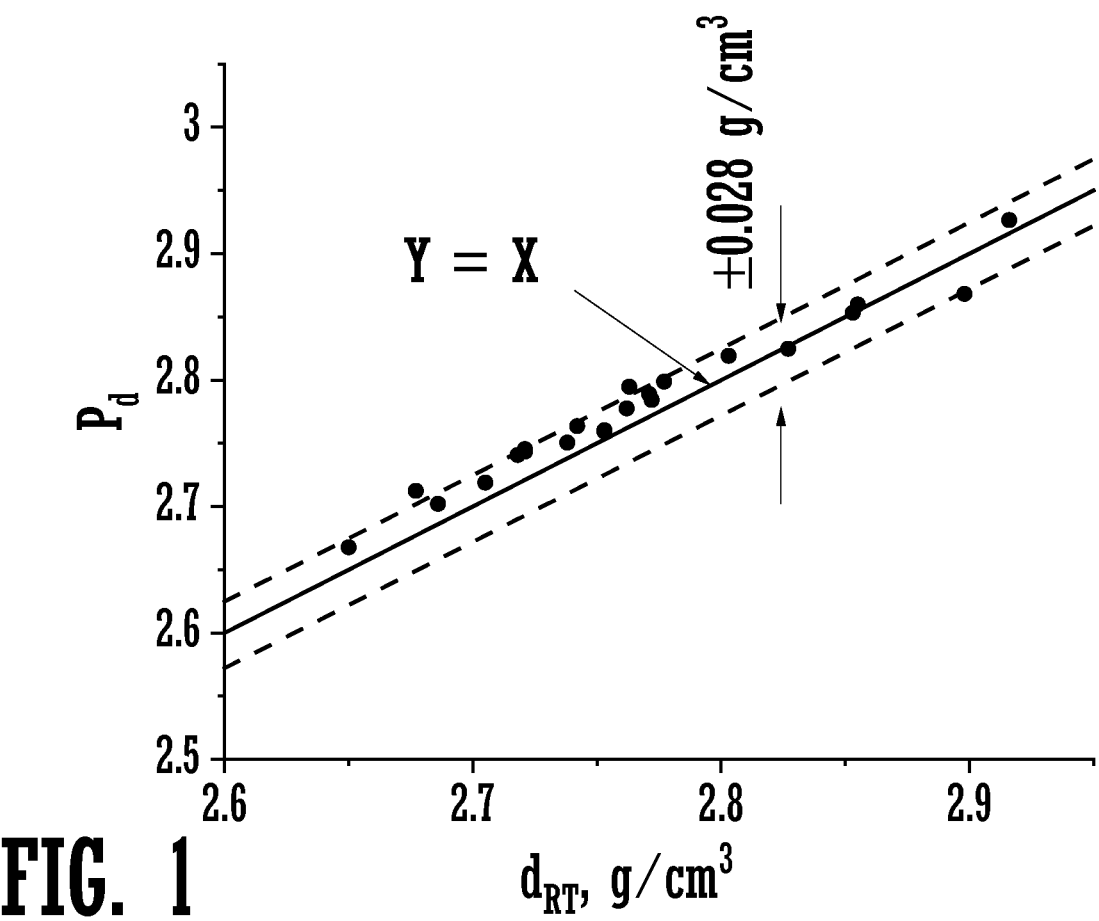
FIG. 1 is a plot illustrating the relationship between the density $d_{RT}$ and the parameter $P_d$ calculated by formula (II) for some Comparative Glasses and some Exemplary Glasses according to an aspect of the present disclosure.

In the following detailed description, for purposes of explanation and not limitation, examples disclosing specific details are set forth to provide a thorough understanding of various principles of the present disclosure. However, it will be apparent to one having ordinary skill in the art, having had the benefit of the present disclosure, that aspects of the present disclosure may be practiced that depart from the specific details or examples disclosed herein. Moreover, descriptions of well-known devices, methods and materials may be omitted so as not to obscure the description of various principles of the present disclosure. Finally, wherever applicable, like reference numerals refer to like elements.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including, without limitation, matters of logic with respect to arrangement of steps or operational flow; plain meaning derived from grammatical organization or punctuation; the number or type of aspects of the disclosure described in the specification.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Modifications of the disclosure will occur to those skilled in the art and to those who make or use the disclosure. Therefore, it is understood that the aspects of the present disclosure shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those skilled in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two scenarios: one modified by "about," and one not modified by "about." It will be further understood that the end-points of each of the ranges are significant both in relation to the other end-point, and independently of the other end-point.

The term "formed from" can mean one or more of comprises, consists essentially of, or consists of. For example, a component that is formed from a particular material can comprise the particular material, consist essentially of the particular material, or consist of the particular material.

The terms "free" and "substantially free" are used interchangeably herein to refer to an amount and/or an absence of a particular component in a glass composition that is not intentionally added to the glass composition. It is understood that the glass composition may contain traces of a particular constituent component as a contaminant or a tramp in an amount of less than 0.10 mol. %.

As used herein, the term "tramp", when used to describe a particular constituent component in a glass composition, refers to a constituent component that is not intentionally added to the glass composition and is present in an amount of less than 0.10 mol. %. Tramp components may be unintentionally added to the glass composition as an impurity in another constituent component and/or through migration of the tramp component into the composition during processing of the glass composition.

Unless otherwise specified, the term "glass" is used to refer to a glass made from a glass composition disclosed herein.

The symbol "*" means multiplication when used in any formula herein.

Reference will now be made in detail to various aspects of the present disclosure, including glasses, such as precursor glasses, and/or glass-ceramic articles made therefrom. According to an aspect, a glass-ceramic article includes a first surface, a second surface opposite the first surface, and a perimeter defining a shape of the glass-ceramic article. The glass-ceramic article may further include a phase assemblage comprising one or more crystalline phases and a glass phase, the one or more crystalline phases comprising a crystalline phase comprising a jeffbenite crystalline structure. Various specific glasses, such as precursor glasses, glass-ceramic articles made therefrom, and methods of making glass-ceramic articles will be referred to herein with specific reference to the appended drawings.

Ranges may be expressed herein as from "about" one particular value, and/or to "about" another particular value. When such a range is expressed, another scenario includes from the one particular value and/or to the other particular value. Similarly, when values are expressed as approximations, by use of the antecedent "about," it will be understood that the particular value forms another example covered by the present disclosure. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of aspects of the present disclosure described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The term "substantially free," when used to describe the concentration and/or absence of a particular constituent component in a glass (e.g., precursor glass) or glass-ceramic composition, means that the constituent component is not intentionally added to the glass or glass-ceramic composition. However, the glass or class-ceramic composition may contain traces of the constituent component as a contaminant or tramp in amounts of less than 0.05 mol. %.

According to an aspect of the present disclosure regarding the glass or glass-ceramic compositions described herein, the concentrations of constituent components (e.g., $SiO_2$, $Al_2O_3$, and the like) are specified in mole percent (mol. %) on an oxide basis, unless otherwise specified.

Transmittance data (total transmittance) is measured with a Lambda 950 UV/Vis Spectrophotometer manufactured by PerkinElmer Inc. (Waltham, Mass. USA). The Lambda 950 apparatus was fitted with a 150 mm integrating sphere. Data was collected using an open beam baseline and a Spectralon® reference reflectance disk. For total transmittance (Total Tx), the sample is fixed at the integrating sphere entry point. For diffuse transmittance (Diffuse Tx), the Spectralon® reference reflectance disk over the sphere exit port is removed to allow on-axis light to exit the sphere and enter a light trap. A zero offset measurement is made, with no sample, of the diffuse portion to determine efficiency of the light trap. To correct diffuse transmittance measurements, the zero offset contribution is subtracted from the sample measurement using the equation: Diffuse Tx=Diffuse Measured−(Zero Offset*(Total Tx/100)). The scatter ratio is measured for all wavelengths as: (% DiffuseTx/% TotalTx).

The term "transparent," when used to describe an article herein, refers to an article that has an average transmittance of at least 75% for a light in a wavelength range from 400 nm to 800 nm (inclusive of endpoints) at an article thickness of 0.85 mm.

The term "translucent," unless otherwise specified such as in the claims, when used to describe an article herein, refers to an article that has an average transmittance in a range from 20% to less than 75% for light in a wavelength range from 400 nm to 800 nm (inclusive of endpoints) at an article thickness of 0.85 mm.

The term "opaque," when used to describe a glass-ceramic article formed of a glass-ceramic composition herein, means that the glass-ceramic composition has an average transmittance less than 20% when measured at normal incidence for light in a wavelength range from 400 nm to 800 nm (inclusive of endpoints) at an article thickness of 0.85 mm.

The dimensions of the grains of a crystalline phase or phases of the glass-ceramics described herein are measured using scanning electron microscopy and image analysis.

The terms "melting point" or "melting temperature," as used herein, refer to the temperature at which the viscosity of the glass (e.g., precursor) or glass-ceramic composition is 200 poise.

The term "softening point," as used herein, refers to the temperature at which the viscosity of the glass or glass-ceramic composition is 1×107.6 poise. The softening point is measured according to the parallel plate viscosity method, which measures the viscosity of inorganic glass from 107 to 109 poise as a function of temperature, similartoASTM C1351M.

The term "liquidus viscosity," as used herein, refers to the viscosity of the glass-ceramic at the onset of devitrification (i.e., at the liquidus temperature as determined with the gradient furnace method according to ASTM C829-81).

The elastic modulus (also referred to as Young's modulus) of the glass-based article is provided in units of gigapascals (GPa). The elastic modulus of the glass is determined by resonant ultrasound spectroscopy on bulk samples of each glass-based article in accordance with ASTM C623.

Vickers hardness may be measured using ASTM C1326 and C1327 (and its progeny, all herein incorporated by reference) "Standard Test Methods for Vickers Indentation Hardness of Advanced Ceramics," ASTM International, Conshohocken, Pa., US. According to one aspect, the glass-ceramics exhibit such Vickers indentation crack initiation load values after being chemically strengthened via ion exchange.

The fracture toughness may be measured using a chevron notch short beam, according to ASTM C1421-10, "Standard Test Methods for Determination of Fracture Toughness of Advanced Ceramics at Ambient Temperature" prior to ion-exchange strengthening of the glass-ceramic.

Compressive stress (including surface compressive stress) is measured with a surface stress meter (FSM) such as commercially available instruments such as the FSM-6000, manufactured by Orihara Industrial Co., Ltd. (Japan). Surface stress measurements rely upon the measurement of the stress optical coefficient (SOC), which is related to the birefringence of the glass-ceramic. SOC, in turn, is measured according to Procedure C (Glass Disc Method) described in ASTM standard C770-16, entitled "Standard Test Method for Measurement of Glass Stress-Optical Coefficient," the contents of which are incorporated herein by reference in their entirety. Depth of compression (DOC) is also measured with the FSM. The maximum central tension (CT) values are measured using a scattered light polariscope (SCALP) technique known in the art.

The phrase "depth of compression" and "DOC" refer to the position in the glass-ceramic where compressive stress transitions to tensile stress.

The phrase "glass precursor," "precursor," or "precursor glass", as used herein, refers to a glass or glass article containing one or more nucleating agents and/or nucleation sites (e.g., within a body of the material, which may be homogenously distributed therein and throughout the body), which, upon thermal treatment, at least in part causes (e.g., facilitates) the nucleation of at least one crystalline phase in the glass.

Figure 2:
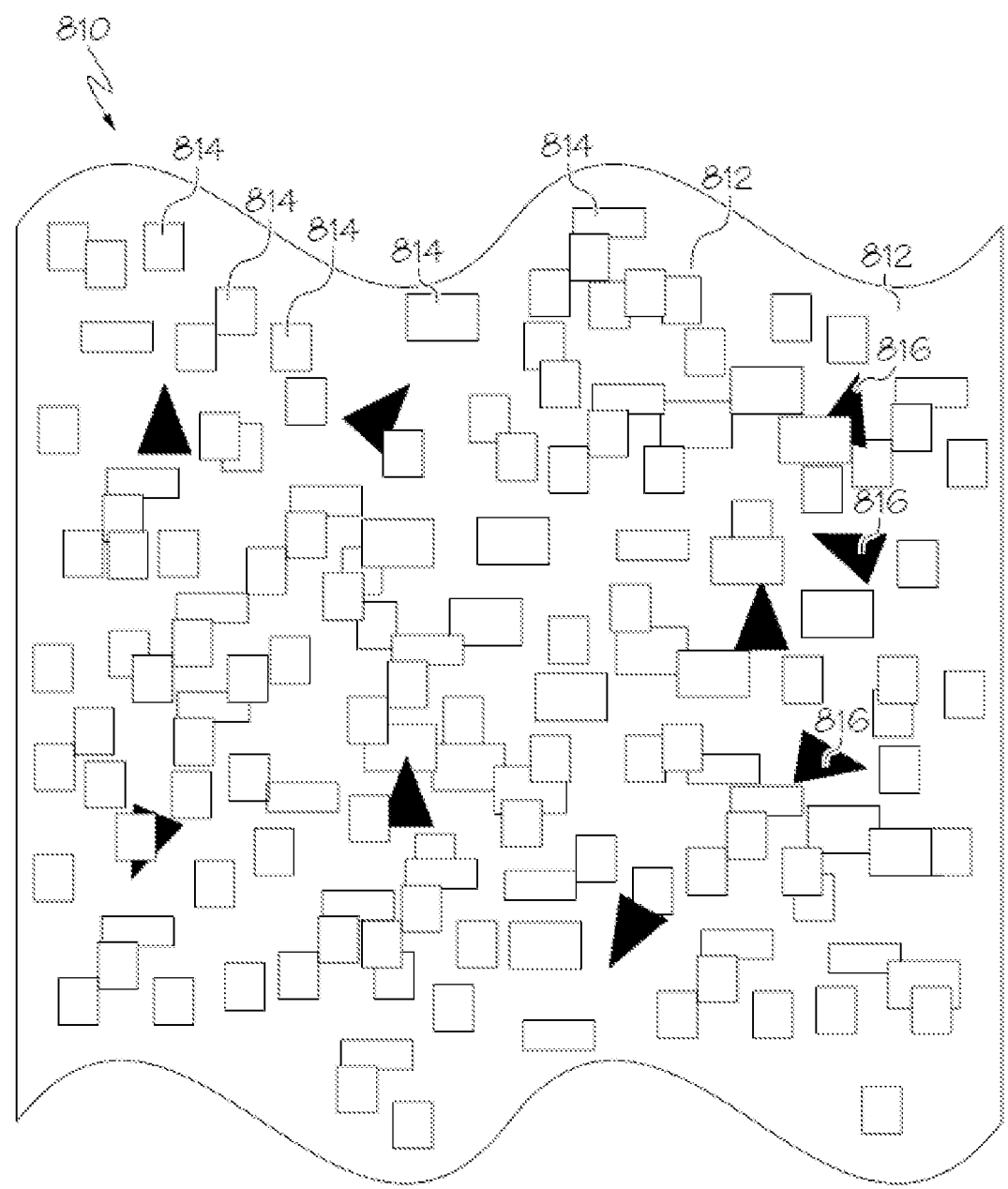
FIG. 2 is a conceptual diagram of a glass-ceramic according to an aspect of the present disclosure.

The phrase "glass-ceramic", as used herein, refers to a material or article formed from a precursor glass following nucleation of at least one crystalline phase in the glass (see generally FIG. 2 and related disclosure).

The phrase "primary crystalline phase," as used herein, refers to a crystalline phase present in the glass-ceramic in an amount (in weight percent (wt. %) of the glass-ceramic) greater than the amount (in wt. % of the glass-ceramic) of any other individual crystalline phases present in the glass-ceramic. For example, if a glass-ceramic comprises crystalline phases A, B, and C and crystalline phase A is the primary crystalline phase, the amount of crystalline phase A in the glass-ceramic is greater than the amount of crystalline phase B in the glass-ceramic and greater than the amount of crystalline phase C in the glass-ceramic.

Articles formed from glass-ceramics generally have improved fracture toughness relative to articles formed from glass. This improvement may be due to the presence of crystalline grains in the glass-ceramics, which may impede crack growth. The fracture toughness of glass-ceramics may be improved by decreasing the number of grains per unit volume of the glass-ceramic-that is by increasing the size of the grains of the glass-ceramic. However, the transparency or optical transmission of glass-ceramics may decrease with increasing grain size. In particular, the transparency of glass-ceramics may be significantly reduced when the size of the grains is larger than 5 μm. Thus, some glass-ceramics may have relatively good mechanical properties (such as fracture toughness) and relatively poor optical characteristics (such as optical transparency or optical transmittance) or relatively poor mechanical properties and relatively good optical characteristics, but not relatively good mechanical properties and relatively good optical characteristics.

In addition, some glass-ceramics may be strengthened by ion exchange processes in which smaller alkali metal ions in the glass-ceramic are exchanged for larger alkali metal ions from, for example, a bath of molten alkali metal salts. As an example, a lithium-containing glass-ceramic may be strengthened by ion exchange by placing the glass-ceramic in a bath of molten alkali metal salts, such as salts of sodium and/or potassium, thereby facilitating the exchange of lithium ions in the glass-ceramic with sodium and/or potassium ions in the bath. However, the recent demand for lithium for use in various applications has reduced availability, thereby increasing the overall complexity for producing glass-ceramics containing lithium which may be strengthened by ion exchange. The glass-ceramics described herein do not require lithium to facilitate desirable ion exchange performance.

Disclosed herein are glasses (e.g., precursor glasses) and glass-ceramics formed therefrom which mitigate the aforementioned problems.

Referring now to FIG. 2 by way of example, a glass-ceramic article 810 is schematically depicted according to an aspect shown and described herein. As noted herein, the phrase "glass-ceramic" refers to a material or article formed from a glass material following nucleation of at least one crystalline phase in the glass. Thus, the glass-ceramic article 810 includes both a glass phase 812 (e.g., amorphous glass; single-phase glass or multi-phase glass) and polycrystalline ceramic (e.g., grains of the primary crystalline phase 814, optionally with grains of accessory crystalline phase(s) 816). The glass phase 812 may be referred to as "residual glass" or a "residual glass phase." Conceivably, the grains of the crystalline phases 814, 816 may be unevenly distributed or directionally grown, such as by localizing heat via laser, or by positioning and/or orienting nucleation sites to guide growth of the grains of the crystalline phases 814, 816, and contemplated examples include such properties; however, generally in the glass-ceramics disclosed herein, the grains of the crystalline phases 814, 816 may be uniformly or homogenously distributed and randomly oriented within the glass phase 812, such as throughout some, most or all of the glass-ceramic article 810. Further, once nucleated from the glass, the grains of the crystalline phases 814, 816 may be grown to contact one another, overlap one another, interlock with one another, and fill more of the volume of the glass-ceramic article 810. Growing the grains of the crystalline phases 814, 816 to different sizes may influence properties of the glass-ceramic article 810, and such properties may be isotropic with grains of the crystalline phases 814, 816 uniformly, homogenously positioned, and randomly oriented when the grains of the crystalline phases 814, 816 have grain sizes and the articles have sizes, as disclosed herein. After nucleation and growth of the grains of the crystalline phases 814, 816, the glass phase 812 surrounds (e.g., contacts, envelops, encapsulates) individual or clusters of the grains of the crystalline phases 814, 816. The glass phase 812 of the glass-ceramic may have more than one glass phase 812 and/or more than one crystalline phase, as shown with crystalline phases 814, 816.

According to an aspect of the present disclosure, glass-ceramics described herein, such as depicted in FIG. 2, have a phase assemblage comprising one or more crystalline phases and a glass phase. At least one of the crystalline phases may comprise a jeffbenite crystalline structure. A crystalline phase having a jeffbenite crystalline structure, as default and unless otherwise specified herein, such as in the claims, refers to a crystalline phase identified as jeffbenite by x-ray diffraction (XRD) analysis. For example, XRD data (such as an XRD spectrum) collected from a sample of glass-ceramic material, along with general compositional information about the composition of the sample (such as the batch composition from which the sample was prepared) may be input into MDI Jade powder XRD Analysis software from Materials Data Inc. The software utilizes the input information, along with the International Center For Diffraction Data's Powder Diffraction File version 4 database (ICDD PDF-4 database), to identify the crystalline phases in the sample based on the compositional information of the sample and the crystalline structure of the phases as determined from the XRD data. According to an aspect, the phase assemblage of the glass-ceramic may have at least one crystalline phase comprising a jeffbenite crystalline structure as determined by this methodology.

Based on the foregoing, unless otherwise specified or further clarified herein, such as in the claims or elsewhere, the phrase "jeffbenite crystalline structure" means a crystalline phase or grains of a crystalline phase identified by XRD analysis as jeffbenite, as described herein, and the further characterizations provided herein may aid in clarifying various examples and forms of crystalline phases having a jeffbenite crystalline structure that may be included and claimed.

According to an aspect, a crystalline phase having a jeffbenite crystalline structure may be the primary crystalline phase in the glass-ceramics. The crystalline phase having a jeffbenite crystalline structure may have attributes (e.g., compositional, molecular structural, microstructural) in common with jeffbenite.

Jeffbenite, named after Jeffrey Harris and Ben Harte, is a mineral recently discovered as inclusions in diamonds from "super-deep" (e.g., >300 km deep) within the mantle of the Earth. Prior to its naming, jeffbenite was called tetragonal-almandine-pyrope-phase ("TAPP"). Jeffbenite may comprise tetragonal $Mg_3Al_2Si_3O_{12}$. The term "tetragonal" refers to the otherwise cubic lattice being stretched along one of its lattice vectors to become a rectangular prism with a square base ("a by a") and height ("c," different from "a"), such as within the space group 142d. The tetragonal crystal structure of jeffbenite may include cell edge parameter α of about 6.5, such as 6.5231(1), such as within 0.1 thereof, and parameter c of about 18.2, such as 18.1756(3) angstroms, such as within 0.1 thereof. A crystalline phase having a jeffbenite crystalline structure may have the tetragonal structure of jeffbenite, as described herein.

The density of jeffbenite (itself) may be about 3.6 g/cm$^3$, such as 3.576 g/cm$^3$ such as within 0.1 g/cm$^3$ thereof. The microhardness of jeffbenite (itself) may be about 7, such as within 1 thereof. Jeffbenite (itself) may be uniaxial (-) with refractive indexes of about 1.7, such as 1.733(5), such as within 0.1 thereof, and of about 1.7, such as 1.721, such as within 0.1 thereof.

While $Mg_3Al_2Si_3O_{12}$ is an ideal form of jeffbenite, jeffbenite can be generally described as a stoichiometric garnet composition, similar to pyrope ($Mg_3Al_2(SiO_4)_3$)-almandine ($Fe_3Al_2(SiO_4)_3$), but with a tetragonal crystalline structure, and may include other elements. Put another way, structurally, jeffbenite and crystals having a jeffbenite crystalline structure may be described as (M1)(M2)$_2$(M3)$_2$(T1)(T2)$_2$O$_{12}$ where M1 comprises magnesium (e.g., is mostly magnesium), M2 comprises aluminum (e.g., is mostly aluminum), M3 comprises magnesium (e.g., is mostly magnesium), and T1 and T2 comprise silicon (e.g., are both mostly silicon), and where two tetrahedra of such crystalline structures do not share any oxygen with one another. Jeffbenite may be categorized as an orthosilicate, such as a silicate containing the tetrahedra group SiO$_4$ where the ratio of silicon to oxygen is 1 to 4.

In an aspect of the present disclosure, regarding the glass-ceramics described herein, the crystalline phase comprising the jeffbenite crystalline structure may at least comprise, mostly consist of (>50 wt. %), consist essentially of, or be tetragonal $Mg_3Al_2Si_3O_{12}$.

In an aspect of the present disclosure, regarding the glass-ceramics described herein, the crystalline phase may comprise the jeffbenite crystalline structure that includes the cations in the proportions that satisfy the conditions:

$$0 \leq (R^{4+}/R^{2+}) \leq 1/3;$$

$$Al^{3+}/R^{2+} \leq 2/3;$$

$$1.0 \leq R^{2+}/Si^{4+} \leq 4/3,$$

where $R^{2+}$ is a sum of all divalent metal cations comprising, at least, $Mg^{2+}$, and $R^{4+}$ is a sum of tetravalent element cations excluding $Si^{4+}$, and each of the quantities $R^{2+}$, $R^{4+}$, $Al^{3+}$ and $Si^{4+}$ is expressed in terms of cationic percent, such as $0 \leq (R^{4+}/R^{2+}) \leq 0.35$, such as $0 \leq (R^{4+}/R^{2+}) \leq 0.4$, such as $0 \leq (R^{4+}/R^{2+}) \leq 0.5$, and/or such as $0 \leq (R^{4+}/R^{2+}) \leq 0.35$, such as $0.05 \leq (R^{4+}/R^{2+}) \leq 0.35$, such as $0.1 \leq (R^{4+}/R^{2+}) \leq 0.35$, such as $0.15 \leq (R^{4+}/R^{2+}) \leq 0.35$ or any combination of such range boundaries, or another value for $(R^{4+}/R^{2+})$; and/or such as $Al^{3+}/R^{2+} \leq 0.7$, such as $Al^{3+}/R^{2+} \leq 0.75$, such as $Al^{3+}/R^{2+} \leq 0.8$, or another value for $Al^{3+}/R^{2+}$; and/or such as $1.0 \leq R^{2+}/Si^{4+} \leq 1.35$, such as $1.0 \leq R^{2+}/Si^{4+} \leq 1.4$, such as $1.0 \leq R^{2+}/Si^{4+} \leq 1.5$, and/or such as $1.05 \leq R^{2+}/Si^{4+} \leq 4/3$, such as $1.1 \leq R^{2+}/Si^{4+} \leq 4/3$, such as $1.15 \leq R^{2+}/Si^{4+} \leq 4/3$ or any combination of such range boundaries, or another value for $R^{2+}/Si^{4+}$. Such a crystalline structure may be tetragonal for jeffbenite as disclosed here, such as within the I-42d space group. Such a crystalline structure may an X-ray diffraction spectrum comprising a first peak between 2-theta angles of 30° to 32°; a second peak between 2-theta angles of 33° to 35°; a third peak between 2-theta angles of 40° to 42°; and a fourth peak and a fifth peak between 2-theta angles of 55° to 58°, wherein the first, second, third, fourth, and fifth peaks correspond to jeffbenite as disclosed herein.

In an aspect of the present disclosure, regarding the glass-ceramics described herein, the crystalline phase comprising the jeffbenite crystalline structure (or a portion thereof) may be modified by the addition of zirconia ($ZrO_2$). Without intending to be bound by any theory, alumina (i.e., an aluminum contribution) may be at least partially replaced in the jeffbenite crystalline structure by magnesia (i.e., a magnesium contribution) and zirconia (i.e., a zirconium contribution). In such aspects, the crystalline phase comprising the jeffbenite crystalline structure (or a portion thereof) may have a composition according to the following formula: $Mg_{3+x}Zr_xAl_{2-2x}Si_3O_{12}$, where x is greater than or equal to 0 to less than 1. According to an aspect, x may be greater than or equal to 0 to less than or equal to 0.6. For example, without limitation, the crystalline phase having the jeffbenite crystalline structure (or a portion thereof) may have the composition(s): $Mg_3Al_2Si_3O_{12}$, $Mg_3.1Zr_{0.1}Al_{1.8}Si_3O_{12}$, or $Mg_{3.9}Zr_{0.9}Al_{0.2}Si_3O_{12}$, or like.

In an aspect of the present disclosure, regarding the glass-ceramicsdescribed herein, the crystalline phase comprising the jeffbenite crystalline structure (or a portion thereof) may be further modified by the addition of titania, tin oxide, iron oxide (FeO), manganese oxide, and/or zinc oxide. For example, titania (i.e., a titanium contribution) and/or tin oxide (i.e., a tin contribution) may be substituted for up to 50% of the zirconium in the jeffbenite crystalline structure. Similarly, iron oxide (i.e., an iron contribution), manganese oxide (i.e., a manganese contribution), and/or zinc oxide (i.e., a zinc contribution) may be substituted for a portion of the magnesium in the jeffbenite crystalline structure. In such aspects, the crystalline phase comprising the jeffbenite crystalline structure (or a portion thereof) may have a composition according to the following formula: $(Mg,Fe,Mn,Zn)_{3+x}(Zr,Ti,Sn)_xAl_{2-2x}Si_3O_{12}$, where x is greater than or equal to 0 to less than 1. According to an aspect, x may be greater than or equal to 0 to less than or equal to 0.6. According to such an aspect of the present disclosure, it should be understood that the Fe, Mn, Zn, Ti, and Sn components in the formulas are each optional and the composition may be formed without one or more of these elements. For example, the composition may be free of Fe, but may include Mn, Ti, and Sn, or be free of Sn but include Fe, Mn, Zn and Ti. As such, it should be understood that the above referenced formulas can be written without one or more of Fe, Mn, Zn, Ti, and Sn.

It should be understood that other substitutions and modifications to the crystalline phase comprising the jeffbenite structure are contemplated and possible. For example, glass-ceramics described herein, the crystalline phase comprising the jeffbenite crystalline structure (or a portion thereof) may be modified by the addition of metal oxides to the composition as a source of divalent metal cations (expressed as "$R^{2+}$") in substitution for a portion of the magnesium in the jeffbenite crystalline structure. Examples of divalent metal cations include, without limitation, $Ca^{2+}$, $Mn^{2+}$, $Fe^{2+}$, and the like. In these cases, the divalent metal cations may have an ionic radius of less than 1 angstrom (0.1 nm). Similarly, the crystalline phase comprising the jeffbenite crystalline structure (or a portion thereof) may be modified by the addition of metal oxides to the composition as a source of tetravalent metal cations (expressed as "$R^{4+}$") in substitution for a portion of the zirconium in the jeffbenite crystalline structure. Examples of tetravalent metal cations include $Ti^{4+}$, $Sn^{4+}$, $Hf^{4+}$, and the like. In such cases, the crystalline phase comprising the jeffbenite crystalline structure (or a portion thereof) may have a composition according to the following formula: $(Mg,R^{2+})_{3+x}(Zr, R^{4+})_xAl_{2-2x}Si_3O_{12}$, where x is greater than or equal to 0 to less than 1. According to an aspect of the present disclosure, x may be greater than or equal to 0 to less than or equal to 0.6. In these cases, it should be understood that the $R^{2+}$ and $R^{4+}$ components in the formulas are each optional and the composition may be formed without one or the other of these elements. As such, it should be understood that the above referenced formulas can be written without one or the other of $R^{2+}$ and $R^{4+}$.

In an aspect of the present disclosure, one or more crystalline phases of the phase assemblage may comprise one or more accessory crystalline phases. The one or more accessory crystalline phases may be present in the glass-ceramic in an amount less than the primary crystalline phase. The one or more accessory crystalline phases may comprise tetragonal zirconia ($ZrO_2$), $ZrTiO_4$, or a combination thereof. However, it should be understood that other accessory crystalline phases may also be present in the resultant glass-ceramic. One or more of the accessory crystalline phases may enter the structure of the crystalline phase having the jeffbenite crystalline structure.

Glass composition may include silica ($SiO_2$). $SiO_2$ may be the primary glass former in the glass and glass-ceramic compositions described herein and may function to stabilize the network structure of the glass-ceramics. The concentration of $SiO_2$ in the glass and glass-ceramic compositions should be sufficiently high to form the crystalline phase when the glass is heat-treated to convert the glass to a glass-ceramic. The amount of $SiO_2$ may control the melting point of the glass or glass-ceramic composition, as the melting temperature of pure $SiO_2$ or high-$SiO_2$ glasses is undesirably high. Thus, limiting the concentration of $SiO_2$ may aid in improving the meltability and the formability of the glass or glass-ceramic composition. Accordingly, the content of silica is preferably limited. According to an aspect of the present disclosure, the glass composition may contain a positive amount of silica ($SiO_2$), such as more than tramp amounts (i.e. at least 0.01 mol %), such as in an amount greater than or equal to 20.0 mol. % and/or less than or equal to 80.0 mol. % and all ranges and sub-ranges between the foregoing values. The glass composition may contain $SiO_2$ in an amount greater than or equal to 20.0 mol. %, greater than or equal to 25.0 mol. %, greater than or equal to 30.0 mol. %, greater than or equal to 35.0 mol. %, greater than or equal to 36.0 mol. %, greater than or equal to 40.5 mol. %, greater than or equal to 42.0 mol. %, greater than or equal to 45.0 mol. %, greater than or equal to 45.9 mol. %, greater than or equal to 65.0 mol. %, greater than or equal to 70.0 mol. %, or greater than or equal to 75.0 mol. %. The glass composition may contain $SiO_2$ in an amount less than or equal to 80.0 mol. %, less than or equal to 75.0 mol. %, less than or equal to 70.0 mol. %, less than or equal to 65.0 mol. %, less than or equal to 60.0 mol. %, less than or equal to 54.5 mol. %, less than or equal to 53.0 mol. %, less than or equal to 52.5 mol. %, less than or equal to 45.0 mol. %, or less than or equal to 30.0 mol. %. The glass composition may contain $SiO_2$ in an amount greater than or equal to 20.0 mol. % and less than or equal to 80.0 mol. %, greater than or equal to 25.0 mol. % and less than or equal to 75.0 mol. %, greater than or equal to 30.0 mol. % and less than or equal to 60.0 mol. %, greater than or equal to 35.0 mol. % and less than or equal to 65.0 mol. %, greater than or equal to 35.0 mol. % and less than or equal to 60.0 mol. %, greater than or equal to 36.0 mol. % and less than or equal to 75.0 mol. %, greater than or equal to 40.5 mol. % and less than or equal to 53.0 mol. %, greater than or equal to 42.0 mol. % and less than or equal to 52.5 mol. %, greater than or equal to 45.93 mol. % and less than or equal to 54.46 mol. %, greater than or equal to 20.0 mol. % and less than or equal to 30.0 mol. %, greater than or equal to 25.0 mol. % and less than or equal to 30.0 mol. %, greater than or equal to 30.0 mol. % and less than or equal to 45.0 mol. %, greater than or equal to 35.0 mol. % and less than or equal to 45.0 mol. %, greater than or equal to 36.0 mol. % and less than or equal to 80.0 mol. %, greater than or equal to 36.0 mol. % and less than or equal to 45.0 mol. %, greater than or equal to 40.5 mol. % and less than or equal to 80.0 mol. %, greater than or equal to 40.5 mol. % and less than or equal to 45.0 mol. %, greater than or equal to 42.0 mol. % and less than or equal to 80.0 mol. %, greater than or equal to 42.0 mol. % and less than or equal to 45.0 mol. %.

Glass composition may include divalent metal oxides (RO). Various divalent metal oxides, such as, for example, alkaline earth metal oxides (BeO, MgO, CaO, SrO, BaO), zinc oxide (ZnO), iron oxide (FeO), manganese oxide (MnO), nickel oxide (NiO) and others may be added to a glass for some purposes, such as, in particular, formation of Jeffbenite crystals (especially comprising MgO, MnO, FeO), increasing the refractive index of residual glass (especially comprising CaO, SrO and BaO), improving the glass formability (ZnO, CaO, SrO) and meltability (FeO, ZnO, MnO) and other purposes. However, when the concentration of divalent metal oxide is too high, without being bounded to any theory, it is believed that they may reduce the glass formability of melt, causing devitrification when forming. Accordingly, the content of divalent metal oxides is preferably limited.

According to an aspect of the present disclosure, the glass composition may contain a positive amount of divalent metal oxides RO in an amount greater than or equal to 5.0 mol. %, greater than or equal to 25.0 mol. %, or greater than or equal to 50.0 mol. %. The glass composition may contain divalent metal oxides RO in an amount less than or equal to 55.0 mol. %, less than or equal to 50.0 mol. %, or less than or equal to 25.0 mol. %. The glass composition may contain RO in an amount greater than or equal to 5.0 mol. % and less than or equal to 55.0 mol. %, greater than or equal to 5.0 mol. % and less than or equal to 50.0 mol. %, or greater than or equal to 5.0 mol. % and less than or equal to 25.0 mol. %, greater than or equal to 25.0 mol. % and less than or equal to 55.0 mol. %, or greater than or equal to 25.0 mol. % and less than or equal to 50.0 mol. %.

Glass composition may include magnesia (MgO). Additions of MgO may increase the elastic modulus of the glass of the glass and resultant glass-ceramic. MgO may also displace $Al_2O_3$ in the glass network and create a more open network structure, improving ion mobility in the glass network. When the concentration of MgO is low, the amount of crystalline phase may decrease and transmittance of glass-ceramics may be improved; however, when it becomes too low, the glass-ceramics may become hazy. Accordingly, the content of magnesia is preferably limited. When the concentration of MgO is too high, the glass-forming melt may be devitrified because of crystallization of the refractory minerals, such as, for example, periclase (MgO), forsterite ($Mg_2SiO_4$), spinel ($MgAl_2O_4$) and others. The glass composition may contain a positive magnesia (MgO), such as greater than tramp amounts, and/or in an amount that may be less than or equal to 60.0 mol. % and all ranges and sub-ranges between the foregoing values. The glass composition may contain MgO in an amount greater than or equal to 3.5 mol. %, greater than or equal to 10.0 mol. %, greater than or equal to 13.0 mol. %, greater than or equal to 19.0 mol. %, greater than or equal to 20.0 mol. %, greater than or equal to 23.0 mol. %, greater than or equal to 25.0 mol. %, greater than or equal to 26.0 mol. %, greater than or equal to 36.0 mol. %, greater than or equal to 41.0 mol. %, greater than or equal to 46.0 mol. %, or greater than or equal to 50.0 mol. %. The glass composition may contain MgO in an amount less than or equal to 60.0 mol. %, less than or equal to 50.0 mol. %, less than or equal to 46.0 mol. %, less than or equal to 45.0 mol. %, less than or equal to 43.0 mol. %, less than or equal to 41.0 mol. %, less than or equal to 40.5 mol. %, less than or equal to 36.0 mol. %, less than or equal to 35.0 mol. %, less than or equal to 25.0 mol. %, or less than or equal to 10.0 mol. %. The glass composition may contain MgO in an amount greater than or equal to 10.0 mol. % and less than or equal to 50.0 mol. %, greater than or equal to 10.0 mol. % and less than or equal to 45.0 mol. %, greater than or equal to 13.0 mol. % and less than or equal to 50.0 mol. %, greater than or equal to 18.76 mol. % and less than or equal to 35.16 mol. %, greater than or equal to 20.0 mol. % and less than or equal to 50.0 mol. %, greater than or equal to 23.0 mol. % and less than or equal to 43.0 mol. %, greater than or equal to 26.0 mol. % and less than or equal to 40.5 mol. %, greater than or equal to 3.5 mol. % and less than or equal to 51.0 mol. %, greater than or equal to 0.0 mol. % and less than or equal to 10.0 mol. %, greater than or equal to 10.0 mol. % and less than or equal to 51.0 mol. %, greater than or equal to 10.0 mol. % and less than or equal to 25.0 mol. %, greater than or equal to 13.0 mol. % and less than or equal to 25.0 mol. %, greater than or equal to 19.0 mol. % and less than or equal to 25.0 mol. %, greater than or equal to 25.0 mol. % and less than or equal to 35.0 mol. %.

Glass composition may include zinc oxide (ZnO). Additions of ZnO may increase the refractive index of the residual glass in the glass-ceramic to better match the refractive index of the crystalline phase having the jeffbenite crystalline structure in the glass-ceramic. While not wishing to be bound by theory, it is believed that additions of ZnO may result in the replacement of at least a portion of the Mg in the jeffbenite crystalline structure with Zn. ZnO may also help stabilize the glass, prevent devitrification, and lower the liquidus viscosity. However, too much ZnO may disrupt the formation of the crystalline phase having the jeffbenite crystalline structure during ceramming. Accordingly, the content of zinc oxide is preferably limited, or glass compositions may be substantially free of ZnO. The glass composition may contain a positive amount zinc oxide (ZnO), such as greater than tramp amounts, and/or in an amount greater than or equal to 0.0 mol. % and/or less than or equal to 10.0 mol. % and all ranges and sub-ranges between the foregoing values. In aspects, the glass composition may contain only tramp amounts of zinc oxide. The glass composition may contain ZnO in an amount greater than or equal to 0.0 mol. %, or greater than or equal to 5.0 mol. %. The glass composition may contain ZnO in an amount less than or equal to 10.0 mol. %, less than or equal to 12.0 mol. %, less than or equal to 10.0 mol. %, less than or equal to 9.0 mol. %, or less than or equal to 5.0 mol. %. The glass composition may contain ZnO in an amount greater than or equal to 0.0 mol. % and less than or equal to 15.0 mol. %, greater than or equal to 0.0 mol. % and less than or equal to 12.0 mol. %, greater than or equal to 0.0 mol. % and less than or equal to 10.0 mol. %, greater than or equal to 0.0 mol. % and less than or equal to 9.0 mol. %, greater than or equal to 0.0 mol. % and less than or equal to 5.0 mol. %, greater than or equal to 5.0 mol. % and less than or equal to 15.0 mol. %, greater than or equal to 5.0 mol. % and less than or equal to 9.0 mol. %, greater than or equal to 10.0 mol. % and less than or equal to 15.0 mol. %, greater than or equal to 10.0 mol. % and less than or equal to 12.0 mol. %.

Glass composition may include strontium oxide (SrO). Adding strontium oxide to a glass may increase the refractive index of residual glass, making it closer to that of Jeffbenite and, thus, improving the transmittance of the resulting glass-ceramic. Also, SrO may be used as a substitute for a part of $K_2O$ in crystalline phases. However, when added in high concentrations, SrO may adversely precipitate from the melt at high temperatures in forms of refractory minerals, such as strontium aluminosilicate ($SrAl_2Si_2O_8$), strontium titanate ($SrTiO_3$), strontium zirconate ($SrZrO_3$) and others, which, not being bounded to any theory, is believed to be possible to reduce the formation of Jeffbenite crystalline phases. Accordingly, the content of strontium oxide is preferably limited, or glass compositions may be substantially free of SrO. The glass composition may contain a positive amount of strontium oxide (SrO), such as greater than tramp amounts, and/or in an amount greater than 0.0 mol. % and/or less than or equal to 5.0 mol. % and all ranges and sub-ranges between the foregoing values. In aspects, the glass composition may contain only tramp amounts of strontium oxide. The glass composition may contain SrO in an amount less than or equal to 5.0 mol. %, less than or equal to 2.5 mol. %, less than or equal to 2.0 mol. %, less than or equal to 1.5 mol. %, or less than or equal to 1.3 mol. %. The glass composition may contain SrO in an amount greater than or equal to 0.0 mol. % and less than or equal to 5.0 mol. %, greater than or equal to 0.0 mol. % and less than or equal to 2.0 mol. %, greater than or equal to 0.0 mol. % and less than or equal to 1.5 mol. %, greater than or equal to 0.0 mol. % and less than or equal to 1.3 mol. %.

Glass composition may include barium oxide (BaO). Adding barium oxide to a glass may increase the refractive index of residual glass, making it closer to that of Jeffbenite and, thus, improving the transmittance of the resulting glass-ceramic. However, in the case when barium oxide comes to residual glass, without being bounded to any theory, it may adversely decrease the elastic mlduli of glass. Also, BaO may adversely crystallize from the melt at high temperatures in forms of refractory materials, such as, in particular, celsian ($BaAl_2Si_2O_8$), barium titanate ($BaTiO_3$) and others, providing some haze to the resulting glass-ceramic. Accordingly, the content of barium oxide is preferably limited, or glass compositions may be substantially free of BaO. The glass composition may contain a positive amount of barium oxide (BaO), such as greater than tramp amounts and/or in an amount from greater than or equal to 0.0 mol. % to less than or equal to 10.0 mol. % and all ranges and sub-ranges between the foregoing values. In aspects, the glass composition may contain only tramp amounts of barium oxide. The glass composition may contain BaO in an amount less than or equal to 5.0 mol. %, less than or equal to 7.0 mol. %, less than or equal to 6.25 mol. %, less than or equal to 5.0 mol. %, less than or equal to 2.5 mol. %, or less than or equal to 2.0 mol. %. The glass composition may contain BaO in an amount greater than or equal to 0.0 mol. % and less than or equal to 10.0 mol. %, greater than or equal to 0.0 mol. % and less than or equal to 7.0 mol. %, greater than or equal to 0.0 mol. % and less than or equal to 6.25 mol. %, greater than or equal to 0.0 mol. % and less than or equal to 2.0 mol. %.

Glass composition may include monovalent metal oxides (R2O). The effects of some of these oxides on the characteristics of disclosed materials, as the Applicants know, assume, or believe, are described below.

Glass composition may include sodium oxide ($Na_2O$). Additions of $Na_2O$ may lower the liquidus viscosity of the glass which, in turn, may aid in forming or shaping the precursor glass. $Na_2O$ may also facilitate ion-exchange strengthening of the resultant glass-ceramic as most of the $Na_2O$ present in the glass is partitioned into the residual glass phase following heat treatment (i.e., ceramming). However, when the content of $Na_2O$ in the glass composition is high, the jeffbenite phase may not form; not being bounded to any theory, the Applicants believe that this may be caused by some chemical reactions between $Na_2O$ and $Al_2O_3$, which may prevent forming alumina-containing phases other than sodium aluminosilicates. Accordingly, the content of sodium oxide is preferably limited, or glass compositions may be substantially free of $Na_2O$. The glass composition may contain a positive amount of sodium oxide ($Na_2O$), such as greater than tramp amounts, and/or an amount greater than or equal to 0.0 mol. % and/or less than or equal to 18.0 mol. % and all ranges and sub-ranges between the foregoing values. The glass composition may contain only tramp amounts of sodium oxide. The glass composition may contain $Na_2O$ in an amount greater than or equal to 0.0 mol. %, greater than or equal to 0.9 mol. %, greater than or equal to 3.0 mol. %, greater than or equal to 5.0 mol. %, greater than or equal to 10.0 mol. %, greater than or equal to 12.0 mol. %, greater than or equal to 14.0 mol. %, or greater than or equal to 16.0 mol. %. The glass composition may contain $Na_2O$ in an amount less than or equal to 18.0 mol. %, less than or equal to 16.0 mol. %, less than or equal to 15.0 mol. %, less than or equal to 14.0 mol. %, less than or equal to 12.0 mol. %, less than or equal to 10.0 mol. %, less than or equal to 7.5 mol. %, less than or equal to 6.0 mol. %, less than or equal to 5.0 mol. %, less than or equal to 4.4 mol. %, or less than or equal to 4.2 mol. %. The glass composition may contain $Na_2O$ in an amount greater than or equal to 0.0 mol. % and less than or equal to 15.0 mol. %, greater than or equal to 0.0 mol. % and less than or equal to 10.0 mol. %, greater than or equal to 0.0 mol. % and less than or equal to 7.5 mol. %, greater than or equal to 0.0 mol. % and less than or equal to 5.0 mol. %, greater than or equal to 0.0 mol. % and less than or equal to 4.4 mol. %, greater than or equal to 0.9 mol. % and less than or equal to 4.2 mol. %, greater than or equal to 2.75 mol. % and less than or equal to 5.77 mol. %, greater than or equal to 0.0 mol. % and less than or equal to 18.0 mol. %, greater than or equal to 0.0 mol. % and less than or equal to 4.2 mol. %, greater than or equal to 3.0 mol. % and less than or equal to 4.2 mol. %, greater than or equal to 5.0 mol. % and less than or equal to 6.0 mol. %, greater than or equal to 10.0 mol. % and less than or equal to 12.0 mol. %.

Glass composition may include potassium oxide ($K_2O$). Additions of $K_2O$ may lower the liquidus viscosity of the glass which, in turn, may aid in forming or shaping the glass. $K_2O$ may also facilitate ion-exchange strengthening of the resultant glass-ceramic as most of the $K_2O$ is partitioned into the glass phase after ceramming. However, when the content of $K_2O$ in a glass composition is high, the jeffbenite phase may not form; not being bounded to any theory, the Applicants believe that this may be caused by some chemical reactions between $K_2O$ and $Al_2O_3$, which may prevent forming alumina-containing phases other than potassium aluminosilicates. Accordingly, the content of potassium oxide is preferably limited, or glass compositions may be substantially free of $K_2O$. The glass composition may contain a positive amount of potassium oxide ($K_2O$), such as greater than tramp amounts, and/or an amount from greater than or equal to 0.0 mol. % to less than or equal to 18.0 mol. % and all ranges and sub-ranges between the foregoing values. The glass composition may contain only tramp amounts of potassium oxide. The glass composition may contain $K_2O$ in an amount greater than or equal to 0.0 mol. %, greater than or equal to 2.0 mol. %, greater than or equal to 5.0 mol. %, greater than or equal to 10.0 mol. %, greater than or equal to 12.0 mol. %, greater than or equal to 14.0 mol. %, or greater than or equal to 16.0 mol. %. The glass composition may contain $K_2O$ in an amount less than or equal to 18.0 mol. %, less than or equal to 16.0 mol. %, less than or equal to 15.0 mol. %, less than or equal to 14.0 mol. %, less than or equal to 12.0 mol. %, less than or equal to 10.0 mol. %, less than or equal to 8.5 mol. %, less than or equal to 6.0 mol. %, or less than or equal to 5.0 mol. %. The glass composition may contain $K_2O$ in an amount greater than or equal to 0.0 mol. % and less than or equal to 15.0 mol. %, greater than or equal to 0.0 mol. % and less than or equal to 10.0 mol. %, greater than or equal to 0.0 mol. % and less than or equal to 8.5 mol. %, greater than or equal to 1.73 mol. % and less than or equal to 5.66 mol. %, greater than or equal to 0.0 mol. % and less than or equal to 18.0 mol. %, greater than or equal to 2.0 mol. % and less than or equal to 5.0 mol. %, greater than or equal to 12.0 mol. % and less than or equal to 18.0 mol. %, greater than or equal to 12.0 mol. % and less than or equal to 14.0 mol. %.

Glass composition may include lithium oxide ($Li_2O$). Adding lithium oxide may improve the diffusivity of alkali ions through ion exchange strengthening. However, when the amount of lithium oxide is too high, especially when the total content of alkali metal oxides in mole percent exceeds the content of alumina in mole percent, it may adversely reduce the ion diffusivity and reduce the ion-exchange stresses. However, Applicants have discovered aspects of the presently disclosed technology that allow for a strengthened glass-ceramic comprising a jeffbenite crystalline phase without including lithium (i.e. beyond tramp levels), which Applicants believe is a significant discovery given the strengthen properties of the glass-ceramic as well as the optical transmittance properties, as disclosed herein. Accordingly, the content of lithium oxide is preferably limited, or glass compositions may be substantially free of $Li_2O$. The glass composition may contain a positive amount lithium oxide ($Li_2O$), such as greater than tramp amounts, and/or an amount from greater than or equal to 0.0 mol. % and/or less than or equal to 10.0 mol. % and all ranges and sub-ranges between the foregoing values. According to an aspect of the present disclosure, the glass composition may contain only tramp amounts of lithium oxide, or the glass has less than 1.5 mol % lithium oxide, such as less than 1 mol %, such as less than 0.7 mol %, such as less than 0.5 mol %, such as less than 0.3 mol %. However, the glass composition may contain $Li_2O$ in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. The glass composition may contain $Li_2O$ in an amount less than or equal to 10.0 mol. %, less than or equal to 9.0 mol. %, less than or equal to 8.0 mol. %, less than or equal to 7.0 mol. %, less than or equal to 5.0 mol. %, less than or equal to 3.5 mol. %, or less than or equal to 3.0 mol. %. The glass composition may contain $Li_2O$ in an amount greater than or equal to 0.0 mol. % and less than or equal to 7.0 mol. %, greater than or equal to 0.0 mol. % and less than or equal to 3.5 mol. %, greater than or equal to 0.0 mol. % and less than or equal to 3.0 mol. %, greater than or equal to 0.0 mol. % and less than or equal to 10.0 mol. %, greater than or equal to 5.0 mol. % and less than or equal to 10.0 mol. %, greater than or equal to 5.0 mol. % and less than or equal to 7.0 mol. %, greater than or equal to 7.0 mol. % and less than or equal to 10.0 mol. %, greater than or equal to 7.0 mol. % and less than or equal to 8.0 mol. %, greater than or equal to 8.0 mol. % and less than or equal to 10.0 mol. %, greater than or equal to 8.0 mol. % and less than or equal to 9.0 mol. %.

Glass composition may include boron oxide ($B_2O_3$). Boron oxide may be added to the glass in small amounts to improve the meltability, especially in presence of high concentrations of $SiO_2$. However, adding boron oxide to a glass composition may adversely reduce the refractive index of glass. Also, without being bounded by any theory, $B_2O_3$ may decrease the diffusivity of alkali metal ions during ion exchange, which may, in turn, reduce the ion-exchange stresses in the material. Accordingly, the content of boron oxide is preferably limited, or glass compositions may be substantially free of $B_2O_3$. The glass composition may contain a positive amount of boron oxide ($B_2O_3$), such as greater than tramp amounts, and/or an amount from greater than or equal to 0.0 mol. % to less than or equal to 4.0 mol. % and all ranges and sub-ranges between the foregoing values. The glass composition may contain only tramp amounts of boron oxide. The glass composition may contain $B_2O_3$ in an amount less than or equal to 4.0 mol. %, less than or equal to 2.0 mol. %, less than or equal to 0.9 mol. %, or less than or equal to 0.1 mol. %. The glass composition may contain $B_2O_3$ in an amount greater than or equal to 0.0 mol. % and less than or equal to 4.0 mol. %, greater than or equal to 0.0 mol. % and less than or equal to 0.9 mol. %, greater than or equal to 0.0 mol. % and less than or equal to 0.1 mol. %.

Glass composition may include manganese oxide ($MnO_2$). Manganese oxide may be useful to form jeffbenite crystalline phase as a constituent thereof, but may be at least partially replaced by zirconia. If the amount of manganese constituent decreases (and zirconium increases), then viscosity of resulting glass may increase, which may influence or improve forming and manufacturing.

The glass composition may contain a positive amount of manganese oxide ($MnO_2$), such as greater than tramp amounts, and/or an amount from greater than or equal to 0.0 mol. % and/or less than or equal to 15.0 mol. %, such as less than or equal to 10.0 mol. % and all ranges and sub-ranges between the foregoing values. The glass composition may contain only tramp amounts of manganese oxide. The glass composition may contain $MnO_2$ in an amount greater than or equal to 0.0 mol. %, or greater than or equal to 5.0 mol. %. The glass composition may contain $MnO_2$ in an amount less than or equal to 10.0 mol. % or less than or equal to 5.0 mol. %. The glass composition may contain $MnO_2$ in an amount greater than or equal to 0.0 mol. % and less than or equal to 10.0 mol. %, greater than or equal to 0.0 mol. % and less than or equal to 5.0 mol. %.

Glass composition may include yttria ($Y_2O_3$). Without wishing to be bound by theory, $Y_2O_3$ may stabilize $ZrO_2$ included in the glass or glass-ceramic composition. Also, adding $Y_2O_3$ may increase the elastic moduli and refractive index of residual glass in the case if it does not crystallize. However, when the content of $Y_2O_3$ is too high, without wishing to be bound by theory, it may adversely crystallize at high temperatures in different form, such as, for example, yttria alumina garnet (YAG, $Y_3Al_5O_{12}$), thus reducing the amount of Jeffbenite phases. Accordingly, the content of yttria is preferably limited, or glass compositions may be substantially free of $Y_2O_3$. The glass composition may contain a positive amount of yttria ($Y_2O_3$), such as greater than tramp amounts, and/or an amount from greater than or equal to 0.0 mol. % and/or less than or equal to 10.0 mol. % and all ranges and sub-ranges between the foregoing values. The glass composition may contain only tramp amounts of yttria. The glass composition may contain $Y_2O_3$ in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. The glass composition may contain $Y_2O_3$ in an amount less than or equal to 10.0 mol. %, less than or equal to 9.0 mol. %, less than or equal to 8.0 mol. %, less than or equal to 7.0 mol. %, less than or equal to 5.0 mol. %, less than or equal to 1.5 mol. %, or less than or equal to 1.35 mol. %. The glass composition may contain $Y_2O_3$ in an amount greater than or equal to 0.0 mol. % and less than or equal to 7.0 mol. %, greater than or equal to 0.0 mol. % and less than or equal to 1.5 mol. %, greater than or equal to 0.0 mol. % and less than or equal to 1.35 mol. %, greater than or equal to 0.0 mol. % and less than or equal to 10.0 mol. %, greater than or equal to 5.0 mol. % and less than or equal to 10.0 mol. %, greater than or equal to 5.0 mol. % and less than or equal to 7.0 mol. %, greater than or equal to 7.0 mol. % and less than or equal to 10.0 mol. %, greater than or equal to 7.0 mol. % and less than or equal to 8.0 mol. %, greater than or equal to 8.0 mol. % and less than or equal to 10.0 mol. %, greater than or equal to 8.0 mol. % and less than or equal to 9.0 mol. %.

Glass composition may include oxides of iron, FeO and/or $Fe_2O_3$. The sum of $FeO+2*Fe_2O_3$, in terms of mole percent, evaluates the amount of iron atoms in 100 moles of oxides glass, considering each mole of FeO including 1 gram-atom Fe and each mole of $Fe_2O_3$ including 2 gram-atoms Fe. When the sum of $Fe_2O+2*Fe_2O_3$ is high, the undesirable effects characterizing both FeO and $Fe_2O_3$ may exhibit. Accordingly, the content of $FeO+2*Fe_2O_3$ is preferably limited, or glass compositions may be substantially free of FeO and $Fe_2O_3$. The glass composition may contain a positive sum (i.e. amount, value) of $FeO+2*Fe_2O_3$, such as greater than tramp amounts, and/or an amount from greater than or equal to 0.0 mol. % and/or less than or equal to 18.0 mol. % and all ranges and sub-ranges between the foregoing values. In aspects, the glass composition may contain only tramp amounts of oxides of iron and/or only tramp amounts of $FeO+2*Fe_2O_3$. The glass composition may contain $FeO+2*Fe_2O_3$ in an amount greater than or equal to 0.0 mol. %, greater than or equal to 5.0 mol. %, greater than or equal to 10.0 mol. %, greater than or equal to 12.0 mol. %, greater than or equal to 14.0 mol. %, or greater than or equal to 16.0 mol. %. The glass composition may contain $FeO+2*Fe_2O_3$ in an amount less than or equal to 18.0 mol. %, less than or equal to 16.0 mol. %, less than or equal to 14.0 mol. %, less than or equal to 12.0 mol. %, less than or equal to 10.0 mol. %, or less than or equal to 5.0 mol. %. The glass composition may contain $FeO+2*Fe_2O_3$ in an amount greater than or equal to 0.0 mol. % and less than or equal to 18.0 mol. %, greater than or equal to 0.0 mol. % and less than or equal to 5.0 mol. %, greater than or equal to 5.0 mol. % and less than or equal to 18.0 mol. %, greater than or equal to 5.0 mol. % and less than or equal to 10.0 mol. %, greater than or equal to 10.0 mol. % and less than or equal to 18.0 mol. %, greater than or equal to 10.0 mol. % and less than or equal to 12.0 mol. %, greater than or equal to 12.0 mol. % and less than or equal to 18.0 mol. %, greater than or equal to 12.0 mol. % and less than or equal to 14.0 mol. %, greater than or equal to 14.0 mol. % and less than or equal to 18.0 mol. %, greater than or equal to 14.0 mol. % and less than or equal to 16.0 mol. %.

Glass composition may include lanthanum oxide ($La_2O_3$). Lanthanum oxide may be added to the glass to increase the refractive index, making it closer to that of jeffbenite crystals and, therefore, improving the transmittance. Also, lanthanum oxide may increase the Young's modulus of the glass phase. However, when being added in high concentrations, lanthanum oxide may precipitate in forms of refractory materials, such as lanthanum aluminate $La_3Al_5O_{12}$ or lanthanum disilicate $La_2Si_2O_7$, causing devitrification of the melt and providing undesirable haze to the resulting material. Accordingly, the content of lanthanum oxide is preferably limited, or glass compositions may be substantially free of $La_2O_3$. The glass composition may contain a positive amount of lanthanum oxide ($La_2O_3$), such as greater than tramp amounts, and/or in an amount from greater than or equal to 0.0 mol. %, such as greater than or equal to 1.0 mol. %, such as greater than or equal to 2.0 mol %, such as greater than or equal to 2.5 mol. %, and/or less than or equal to 10.0 mol. %, such as less than or equal to 8.0 mol. %, such as less than or equal to 7.5 mol. % and all ranges and sub-ranges between the foregoing values. The glass composition may contain only tramp amounts of lanthanum oxide. The glass composition may contain $La_2O_3$ in an amount less than or equal to 5.0 mol. %, less than or equal to 5.0 mol. %, less than or equal to 2.5 mol. %, or less than or equal to 1.0 mol. %. The glass composition may contain $La_2O_3$ in an amount greater than or equal to 0.0 mol. % and less than or equal to 10.0 mol. %, greater than or equal to 0.0 mol. % and less than or equal to 1.0 mol. %.

Glass composition may include phosphorus oxide ($P_2O_5$). $P_2O_5$ may be added in the glass compositions of the present disclosure to aid the process of nucleation. Further, Applicants believe P2O5 may help open or loosen molecular structure of the glass network to facilitate ion exchange. However, without wishing to be bound by theory, inclusion of $P_2O_5$ in the glass or glass-ceramic composition may result in the formation of magnesium phosphate and reduced formation of the crystalline phase having the jeffbenite crystalline structure. Accordingly, the content of phosphorus oxide is preferably limited, or glass compositions may be substantially free of $P_2O_5$. The glass composition may contain a positive amount of phosphorus oxide ($P_2O_5$), such as greater than tramp amounts, and/or an amount from greater than or equal to 0.0 mol. % and/or less than or equal to 5.0 mol. % and all ranges and sub-ranges between the foregoing values. The glass composition may contain only tramp amounts of phosphorus oxide. The glass composition may contain $P_2O_5$ in an amount less than or equal to 5.0 mol. %, less than or equal to 2.5 mol. %, less than or equal to 1.5 mol. %, less than or equal to 1.0 mol. %, less than or equal to 0.45 mol. %, or less than or equal to 0.1 mol. %. The glass composition may contain $P_2O_5$ in an amount greater than or equal to 0.0 mol. % and less than or equal to 1.5 mol. %, greater than or equal to 0.0 mol. % and less than or equal to 1.0 mol. %, greater than or equal to 0.0 mol. % and less than or equal to 0.45 mol. %, greater than or equal to 0.0 mol. % and less than or equal to 0.1 mol. %, greater than or equal to 0.0 mol. % and less than or equal to 5.0 mol. %.

Glass composition may include tantalum oxide ($Ta_2O_5$). Tantalum oxide provides high refractive index and high density, which may help to improve the transmittance. However, tantalum oxide is fairly rare, and adding it in a glass may be inefficient. Accordingly, the content of tantalum oxide is preferably limited, or glass compositions may be substantially free of $Ta_2O_5$. The glass composition may contain a positive amount of tantalum oxide ($Ta_2O_5$), such as greater than tramp amounts, and/or in an amount from greater than or equal to 0.0 mol. % and/or less than or equal to 5.0 mol. % and all ranges and sub-ranges between the foregoing values. The glass composition may contain only tramp amounts of tantalum oxide. The glass composition may contain $Ta_2O_5$ in an amount less than or equal to 5.0 mol. %, less than or equal to 2.5 mol. %, or less than or equal to 2.0 mol. %. The glass composition may contain $Ta_2O_5$ in an amount greater than or equal to 0.0 mol. % and less than or equal to 2.0 mol. %, greater than or equal to 0.0 mol. % and less than or equal to 5.0 mol. %.

Glass composition may include hafnium oxide ($HfO_2$). Not being bounded to any theory, the Applicants believe and have demonstrated empirically that in the crystalline phases of the glass-ceramics hafnium may replace zirconium (e.g., is structurally); accordingly, hafnium oxide may be used as a substitute for zirconia according to an aspect of the present disclosure. The glass composition may contain a positive amount of hafnium oxide ($HfO_2$), such as greater than tramp amounts, and/or in an amount from greater than or equal to 0.0 mol. % and/or less than or equal to 15.0 mol. %, such as less than or equal to 12.0 mol. %, such as less than or equal to 10.0 mol. %, and all ranges and sub-ranges between the foregoing values. The glass composition may contain only tramp amounts of hafnium oxide. The glass composition may contain $HfO_2$ in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. The glass composition may contain $HfO_2$ in an amount less than or equal to 10.0 mol. %, less than or equal to 9.5 mol. %, less than or equal to 9.0 mol. %, less than or equal to 8.0 mol. %, less than or equal to 7.0 mol. %, less than or equal to 5.0 mol. %, or less than or equal to 3.0 mol. %. The glass composition may contain $HfO_2$ in an amount greater than or equal to 0.0 mol. % and less than or equal to 3.0 mol. %, greater than or equal to 0.0 mol. % and less than or equal to 10.0 mol. %, greater than or equal to 5.0 mol. % and less than or equal to 10.0 mol. %, greater than or equal to 5.0 mol. % and less than or equal to 7.0 mol. %, greater than or equal to 7.0 mol. % and less than or equal to 10.0 mol. %, greater than or equal to 7.0 mol. % and less than or equal to 8.0 mol. %, greater than or equal to 8.0 mol. % and less than or equal to 10.0 mol. %, greater than or equal to 8.0 mol. % and less than or equal to 9.0 mol. %.

Glass composition may include titania ($TiO_2$). Without bounding by theory, it is believed that $TiO_2$ acts as a nucleating agent that facilitates the formation of crystalline phases during heat treatment. Increasing concentrations of $TiO_2$ may also impart color to the glass and resultant glass-ceramic. Accordingly, the content of titania is preferably limited, or glass compositions may be substantially free of $TiO_2$. The glass composition may contain a positive amount of titania ($TiO_2$), such as greater than tramp amounts, and/or in an amount from greater than or equal to 0.0 mol. % and/or less than or equal to 5.5 mol. % and all ranges and sub-ranges between the foregoing values. The glass composition may contain only tramp amounts of titania. The glass composition may contain $TiO_2$ in an amount greater than or equal to 0.0 mol. %, greater than or equal to 0.2 mol. %, greater than or equal to 0.3 mol. %, greater than or equal to 0.4 mol. %, greater than or equal to 2.5 mol. %, greater than or equal to 4.0 mol. %, greater than or equal to 4.5 mol. %, or greater than or equal to 5.0 mol. %. The glass composition may contain $TiO_2$ in an amount less than or equal to 5.5 mol. %, less than or equal to 5.0 mol. %, less than or equal to 4.95 mol. %, less than or equal to 4.65 mol. %, less than or equal to 4.5 mol. %, less than or equal to 4.0 mol. %, less than or equal to 3.0 mol. %, less than or equal to 2.5 mol. %, less than or equal to 2.1 mol. %, or less than or equal to 1.8 mol. %. The glass composition may contain $TiO_2$ in an amount greater than or equal to 0.0 mol. % and less than or equal to 5.5 mol. %, greater than or equal to 0.0 mol. % and less than or equal to 4.95 mol. %, greater than or equal to 0.0 mol. % and less than or equal to 4.65 mol. %, greater than or equal to 0.0 mol. % and less than or equal to 4.5 mol. %, greater than or equal to 0.0 mol. % and less than or equal to 3.0 mol. %, greater than or equal to 0.2 mol. % and less than or equal to 2.1 mol. %, greater than or equal to 0.33 mol. % and less than or equal to 1.78 mol. %, greater than or equal to 0.4 mol. % and less than or equal to 1.8 mol. %, greater than or equal to 0.0 mol. % and less than or equal to 1.8 mol. %, greater than or equal to 0.2 mol. % and less than or equal to 1.8 mol. %, greater than or equal to 0.3 mol. % and less than or equal to 5.5 mol. %, greater than or equal to 0.3 mol. % and less than or equal to 1.8 mol. %, greater than or equal to 0.4 mol. % and less than or equal to 5.5 mol. %, greater than or equal to 2.5 mol. % and less than or equal to 3.0 mol. %.

Glass composition may include zirconia ($ZrO_2$). Without bounding to any theory, it is believed that $ZrO_2$ acts as a nucleating agent that facilitates the nucleation of the crystalline phase having the jeffbenite crystalline structure during heat treatment at ambient atmospheric pressure (i.e., ~100 kPa). Accordingly, the content of zirconia is preferably limited. The $ZrO_2$ may be tetragonal $ZrO_2$. The glass composition may contain a positive amount of zirconia ($ZrO_2$), such as greater than tramp amounts, and/or in an amount from greater than or equal to 0.0 mol. % and/or less than or equal to 10.0 mol. % and all ranges and sub-ranges between the foregoing values. The glass composition may contain only tramp amounts of zirconia. The glass composition may contain $ZrO_2$ in an amount greater than or equal to 0.0 mol. %, greater than or equal to 0.5 mol. %, greater than or equal to 1.0 mol. %, greater than or equal to 2.2 mol. %, greater than or equal to 2.3 mol. %, greater than or equal to 2.5 mol. %, greater than or equal to 5.0 mol. %, greater than or equal to 7.0 mol. %, greater than or equal to 8.0 mol. %, or greater than or equal to 9.0 mol. %. The glass composition may contain $ZrO_2$ in an amount less than or equal to 10.0 mol. %, less than or equal to 9.5 mol. %, less than or equal to 9.0 mol. %, less than or equal to 8.0 mol. %, less than or equal to 7.5 mol. %, less than or equal to 7.0 mol. %, less than or equal to 5.0 mol. %, less than or equal to 4.4 mol. %, less than or equal to 4.1 mol. %, or less than or equal to 3.8 mol. %. The glass composition may contain $ZrO_2$ in an amount greater than or equal to 0.0 mol. % and less than or equal to 5.0 mol. %, greater than or equal to 0.5 mol. % and less than or equal to 7.5 mol. %, greater than or equal to 1.0 mol. % and less than or equal to 5.0 mol. %, greater than or equal to 2.2 mol. % and less than or equal to 4.4 mol. %, greater than or equal to 2.32 mol. % and less than or equal to 3.8 mol. %, greater than or equal to 2.5 mol. % and less than or equal to 4.1 mol. %, greater than or equal to 0.0 mol. % and less than or equal to 10.0 mol. %, greater than or equal to 0.0 mol. % and less than or equal to 3.8 mol. %, greater than or equal to 0.5 mol. % and less than or equal to 10.0 mol. %, greater than or equal to 0.5 mol. % and less than or equal to 3.8 mol. %, greater than or equal to 1.0 mol. % and less than or equal to 3.8 mol. %, greater than or equal to 2.2 mol. % and less than or equal to 3.8 mol. %, greater than or equal to 2.3 mol. % and less than or equal to 3.8 mol. %, greater than or equal to 2.5 mol. % and less than or equal to 3.8 mol. %.

According to an aspect of the present disclosure, glass composition may include alumina ($Al_2O_3$). Like $SiO_2$, $Al_2O_3$ may also stabilize the glass network and additionally provides improved mechanical properties and chemical durability to the glass-ceramics. The amount of $Al_2O_3$ may also be tailored to the control the viscosity of the glass or glass-ceramic composition. However, if the amount of $Al_2O_3$ is too high, the viscosity of the glass melt may increase. Accordingly, the content of alumina is preferably limited. The glass composition may contain a positive amount of alumina ($Al_2O_3$), such as greater than tramp amounts, and/or in an amount from greater than or equal to 0.5 mol. % and/or less than or equal to 25.0 mol. %, such as less than or equal to 20.0 mol. %, such as less than or equal to 15.0 mol. % and all ranges and sub-ranges between the foregoing values. The glass composition may contain only tramp amounts of alumina. The glass composition may contain $Al_2O_3$ in an amount greater than or equal to 0.5 mol. %, greater than or equal to 2.0 mol. %, greater than or equal to 5.0 mol. %, greater than or equal to 7.4 mol. %, greater than or equal to 8.0 mol. %, greater than or equal to 8.6 mol. %, greater than or equal to 9.0 mol. %, greater than or equal to 10.0 mol. %, greater than or equal to 11.0 mol. %, or greater than or equal to 13.0 mol. %. The glass composition may contain $Al_2O_3$ in an amount less than or equal to 15.0 mol. %, less than or equal to 15.0 mol. %, less than or equal to 14.1 mol. %, less than or equal to 13.5 mol. %, less than or equal to 13.0 mol. %, less than or equal to 12.8 mol. %, less than or equal to 12.1 mol. %, less than or equal to 12.0 mol. %, less than or equal to 11.0 mol. %, less than or equal to 10.0 mol. %, less than or equal to 9.0 mol. %, or less than or equal to 5.0 mol. %. The glass composition may contain $Al_2O_3$ in an amount greater than or equal to 0.5 mol. % and less than or equal to 12.1 mol. %, greater than or equal to 2.0 mol. % and less than or equal to 12.1 mol. %, greater than or equal to 5.0 mol. % and less than or equal to 20.0 mol. %, greater than or equal to 5.0 mol. % and less than or equal to 15.0 mol. %, greater than or equal to 7.4 mol. % and less than or equal to 14.1 mol. %, greater than or equal to 8.0 mol. % and less than or equal to 13.5 mol. %, greater than or equal to 8.6 mol. % and less than or equal to 12.8 mol. %, greater than or equal to 8.71 mol. % and less than or equal to 11.81 mol. %, greater than or equal to 0.5 mol. % and less than or equal to 20.0 mol. %, greater than or equal to 0.5 mol. % and less than or equal to 5.0 mol. %, greater than or equal to 2.0 mol. % and less than or equal to 5.0 mol. %, greater than or equal to 7.4 mol. % and less than or equal to 9.0 mol. %, greater than or equal to 8.0 mol. % and less than or equal to 20.0 mol. %, greater than or equal to 8.0 mol. % and less than or equal to 9.0 mol. %, greater than or equal to 8.6 mol. % and less than or equal to 9.0 mol. %, greater than or equal to 9.0 mol. % and less than or equal to 10.0 mol. %.

Glass composition may include fluorine (F). Fluorine may be added to the glass inform of various fluorides, such as, for example, calcium fluoride ($CaF_2$), sodium fluoride (NaF) or sodium silicon fluoride ($Na_2SiF_6$) in small concentrations as a fining agent. However, adding the compounds of fluorine to the materials may raise environmental concern. Accordingly, the content of fluorine is preferably limited, or glass compositions may be substantially free of fluorine. The glass composition may contain a positive amount of fluorine (F), such as greater than tramp amounts, and/or in an amount from greater than or equal to 0.0 at. % and/or less than or equal to 1.0 at. % and all ranges and sub-ranges between the foregoing values. The glass composition may contain only tramp amounts of fluorine. The glass composition may contain F in an amount less than or equal to 1.0 at. %, less than or equal to 0.5 at. %, less than or equal to 0.1 at. %, or less than or equal to 0.05 at. %. The glass composition may contain F in an amount greater than or equal to 0.0 at. % and less than or equal to 1.0 at. %, greater than or equal to 0.0 at. % and less than or equal to 0.1 at. %, greater than or equal to 0.0 at. % and less than or equal to 0.05 at. %.

The glass composition may have a sum of CaO+SrO less than or equal to 3.0 mol. %, less than or equal to 2.0 mol. %, less than or equal to 1.45 mol. %, less than or equal to 1.3 mol. %, or less than or equal to 1.0 mol. %. The glass composition may have a CaO+SrO greater than or equal to 0.0 mol. % and less than or equal to 3.0 mol. %, greater than or equal to 0.0 mol. % and less than or equal to 1.45 mol. %, greater than or equal to 0.0 mol. % and less than or equal to 1.3 mol. %, greater than or equal to 0.0 mol. % and less than or equal to 2.0 mol. %, or greater than or equal to 0.0 mol. % and less than or equal to 1.0 mol. %.

The glass composition may have a sum of Cu+Fe+Cr+Co less than or equal to 0.1 mol. % less than or equal to 0.10 mol. % or less than or equal to 0.05 mol. %. The glass composition may have a Cu+Fe+Cr+Co greater than or equal to 0.0 mol. % and less than or equal to 0.1 mol. %, greater than or equal to 0.0 mol. % and less than or equal to 0.10 mol. %, or greater than or equal to 0.0 mol. % and less than or equal to 0.05 mol. %.

The glass composition may have a sum of $GeO_2+TeO_2$ less than or equal to 3.0 mol. %, less than or equal to 2.0 mol. %, or less than or equal to 1.0 mol. %. The glass composition may have a $GeO_2+TeO_2$ greater than or equal to 0.0 mol. % and less than or equal to 3.0 mol. %, greater than or equal to 0.0 mol. % and less than or equal to 2.0 mol. %, or greater than or equal to 0.0 mol. % and less than or equal to 1.0 mol. %.

In combination with the disclosure related to manganese oxide above, the glass composition may contain sum of $MnO+MnO_2$ in an amount less than or equal to 15 mol. %, such as less than or equal to 10 mol. %, such as less than or equal to 7.5 mol. %, such as less than or equal to 5.0 mol. %, such as less than or equal to 3.0 mol. %, less than or equal to 1.5 mol. % or less than or equal to 1.0 mol. %. The glass composition may contain $MnO+MnO_2$ in an amount greater than or equal to 0.0 mol. %, such as greater than tramp levels (i.e. greater than 0.01 mol. %) and less than or equal to 1.5 mol. %, or greater than or equal to 0.0 mol. % and less than or equal to 1.0 mol. %.

The glass composition may have a sum of $Na_2O+K_2O$ greater than or equal to 0.0 mol. %, greater than or equal to 4.1 mol. %, or greater than or equal to 10.0 mol. %. The glass composition may have a sum of $Na_2O+K_2O$ less than or equal to 18.0 mol. %, less than or equal to 11.5 mol. %, or less than or equal to 10.0 mol. %. The glass composition may have a $Na_2O+K_2O$ greater than or equal to 0.0 mol. % and less than or equal to 18.0 mol. %, greater than or equal to 0.0 mol. % and less than or equal to 11.5 mol. %, or greater than or equal to 0.0 mol. % and less than or equal to 10.0 mol. %, greater than or equal to 4.1 mol. % and less than or equal to 18.0 mol. %, greater than or equal to 4.1 mol. % and less than or equal to 11.5 mol. %, or greater than or equal to 4.1 mol. % and less than or equal to 10.0 mol. %, greater than or equal to 10.0 mol. % and less than or equal to 18.0 mol. %, or greater than or equal to 10.0 mol. % and less than or equal to 11.5 mol. %.

The glass composition may have a sum of $Nb_2O_5+Ta_2O_5$ less than or equal to 3.0 mol. %, less than or equal to 2.0 mol. %, or less than or equal to 1.0 mol. %. The glass composition may have a $Nb_2O_5+Ta_2O_5$ greater than or equal to 0.0 mol. % and less than or equal to 3.0 mol. %, greater than or equal to 0.0 mol. % and less than or equal to 2.0 mol. %, or greater than or equal to 0.0 mol. % and less than or equal to 1.0 mol. %.

The glass composition may have a sum of $ZrO_2+HfO_2$ greater than or equal to 0.0 mol. %, greater than or equal to 1.5 mol. %, greater than or equal to 2.2 mol. %, or greater than or equal to 5.0 mol. %. The glass composition may have a sum of $ZrO_2+HfO_2$ less than or equal to 9.5 mol. %, less than or equal to 5.0 mol. %, or less than or equal to 3.8 mol. %. The glass composition may have a $ZrO_2+HfO_2$ greater than or equal to 1.5 mol. % and less than or equal to 9.5 mol. %, greater than or equal to 0.0 mol. % and less than or equal to 9.5 mol. %, greater than or equal to 0.0 mol. % and less than or equal to 5.0 mol. %, or greater than or equal to 0.0 mol. % and less than or equal to 3.8 mol. %, greater than or equal to 1.5 mol. % and less than or equal to 5.0 mol. %, or greater than or equal to 1.5 mol. % and less than or equal to 3.8 mol. %, greater than or equal to 2.2 mol. % and less than or equal to 9.5 mol. %, greater than or equal to 2.2 mol. % and less than or equal to 5.0 mol. %, or greater than or equal to 2.2 mol. % and less than or equal to 3.8 mol. %.

The glass composition may have a sum of $ZrO_2+HfO_2+TiO_2$ greater than or equal to 0.0 mol. %, greater than or equal to 1.5 mol. %, greater than or equal to 3.1 mol. %, or greater than or equal to 5.0 mol. %. The glass composition may have a sum of $ZrO_2+HfO_2+TiO_2$ less than or equal to 9.0 mol. %, less than or equal to 5.0 mol. %, or less than or equal to 4.8 mol. %. The glass composition may have a $ZrO_2+HfO_2+TiO_2$ greater than or equal to 1.5 mol. % and less than or equal to 9.0 mol. %, greater than or equal to 0.0 mol. % and less than or equal to 9.0 mol. %, greater than or equal to 0.0 mol. % and less than or equal to 5.0 mol. %, or greater than or equal to 0.0 mol. % and less than or equal to 4.8 mol. %, greater than or equal to 1.5 mol. % and less than or equal to 5.0 mol. %, or greater than or equal to 1.5 mol. % and less than or equal to 4.8 mol. %, greater than or equal to 3.1 mol. % and less than or equal to 9.0 mol. %, greater than or equal to 3.1 mol. % and less than or equal to 5.0 mol. %, or greater than or equal to 3.1 mol. % and less than or equal to 4.8 mol. %.

According to an aspect of the present disclosure, glass composition may have limitations for $R_2O$—$Al_2O_3$. When monovalent metal oxides, such as alkali metal oxides ($Li_2O$, $Na_2O$, $K_2O$, $Rb_2O$, $Cs_2O$), copper oxide ($Cu_2O$), silver oxide ($Ag_2O$) and others, are added to the glass, they may adversely decrease the viscosity of glass, which, not being bounded to any theory, may cause adverse reducing the ion-exchange stresses in the resulting material. Also, without being bounded to any theory, high amount of monovalent metal oxides may cause devitrification of the melt, reduce the chemical durability, and/or reduce the elastic moduli of glass. Without being bounded to any theory, it is believed that the effects may be reduced in the case when the glass contains a sufficient amount of alumina. Also, without being bounded to any theory, it is believed that the excess of monovalent metal oxides versus alumina may prevent the formation of jeffbenite crystals. Accordingly, it may be preferable that the difference ($R_2O$—$Al_2O_3$) in mole percent has low positive, zero or negative values. The glass may have a difference $R_2O$—$Al_2O_3$ greater than or equal to $-7.0$ mol. %, greater than or equal to 0.5 mol. %, or greater than or equal to 2.5 mol. %. The glass may have a difference $R_2O$—$Al_2O_3$ less than or equal to 9.0 mol. %, less than or equal to 3.0 mol. %, less than or equal to 2.5 mol. %, or less than or equal to 0 mol. %. The glass may have a $R_2O$—$Al_2O_3$ greater than or equal to −7.0 mol. % and less than or equal to 9.0 mol. %, greater than or equal to −7.0 mol. % and less than or equal to 3.0 mol. %, greater than or equal to −7.0 mol. % and less than or equal to 2.5 mol. %, or greater than or equal to −7.0 mol. % and less than or equal to 0 mol. %, greater than or equal to 0.5 mol. % and less than or equal to 9.0 mol. %, greater than or equal to 2.5 mol. % and less than or equal to 9.0 mol. %.

According to an aspect of the present disclosure, glass composition may have limitations for $SiO_2$—$Al_2O_3$—$R_2O$ or $SiO_2$—$(Al_2O_3+R_2O)$. It is believed that for better formation of jeffbenite crystals, it may be preferable that the glass composition is characterized by some excess of silica ($SiO_2$) versus alumina ($Al_2O_3$) and monovalent metal oxides ($R_2O$). Not being bounded to any theory, it is believed that monovalent metal oxides, being added to a glass composition, may bound some part of silica in some structural units, in particular, similar to alkali metasilicates ($R_2SiO_3$) or aluminosilicates ($RalSi_2O_6$), which may make turning silica to jeffbenite crystals more difficult. At the same time, when the excess of silica is too high, it may adversely increase the viscosity of melt, which may, in turn, undesirably increase the melting temperature of the starting materials. Accordingly, in the aspects of the present disclosure, the difference ($SiO_2$—$Al_2O_3$-$R_2O$) in mole percent may be preferably limited. The glass may have a difference $SiO_2$—$Al_2O_3$-$R_2O$ greater than or equal to 30.0 mol. %, or greater than or equal to 40.0 mol. %. The glass may have a difference $SiO_2$—$Al_2O_3$-$R_2O$ less than or equal to 43.6 mol. %, less than or equal to 40.0 mol. %, less than or equal to 38.5 mol. %, or less than or equal to 36.0 mol. %. The glass may have a $SiO_2$—$Al_2O_3$-$R_2O$ greater than or equal to 30.0 mol. % and less than or equal to 43.6 mol. %, greater than or equal to 30.0 mol. % and less than or equal to 40.0 mol. %, greater than or equal to 30.0 mol. % and less than or equal to 38.5 mol. %, or greater than or equal to 30.0 mol. % and less than or equal to 36.0 mol. %.

According to an aspect of the present disclosure, glass composition may have limitations for a ratio MgO/RO. It was empirically found that for better formation of jeffbenite crystals, it is preferable when magnesia (MgO) is a major part in the total amount of divalent metal oxides (RO). Also, when some magnesia is presented in the residual glass, it may increase the Young's modulus of this glass. Accordingly, a ratio of the content of MgO (in mole percent) of total content of divalent metal oxide (in mole percent) may be high. The glass may have a ratio MgO/RO greater than or equal to 0.710 mol. %, greater than or equal to 0.720 mol. %, greater than or equal to 0.725 mol. %, greater than or equal to 0.800 mol. %, greater than or equal to 0.900 mol. %, or greater than or equal to 0.99224 mol. %. The glass may have a ratio MgO/RO less than or equal to 1.000 mol. %, less than or equal to 0.900 mol. %, or less than or equal to 0.800 mol. %. The glass may have a MgO/RO greater than or equal to 0.710 mol. % and less than or equal to 1.000 mol. %, greater than or equal to 0.710 mol. % and less than or equal to 0.900 mol. %, or greater than or equal to 0.710 mol. % and less than or equal to 0.800 mol. %, greater than or equal to 0.720 mol. % and less than or equal to 1.000 mol. %, greater than or equal to 0.720 mol. % and less than or equal to 0.900 mol. %, or greater than or equal to 0.720 mol. % and less than or equal to 0.800 mol. %, greater than or equal to 0.725 mol. % and less than or equal to 1.000 mol. %, greater than or equal to 0.725 mol. % and less than or equal to 0.900 mol. %, or greater than or equal to 0.725 mol. % and less than or equal to 0.800 mol. %, greater than or equal to 0.800 mol. % and less than or equal to 1.000 mol. %, or greater than or equal to 0.800 mol. % and less than or equal to 0.900 mol. %.

According to an aspect of the present disclosure, the glass may have a quantity $d_{RT}-(3.38-0.016*(SiO_2-Al_2O_3-R_2O))$ less than or equal to 0.000.

For example, the glass may have a quantity $d_{RT}-(3.35-0.016*(SiO_2-Al_2O_3-R_2O))$ less than or equal to 0.000.

Jeffbenite formation parameter $P_{jb}$ is a quantity calculated by the following formula (I):

$$P_{jb}=7*\min((SiO_2+ZrO_2+SnO_2)/3,(MgO+MnO+FeO)/3,Al_2O_3), \qquad (I)$$

where chemical formulas mean the amounts of corresponding components in the glass composition.

Jeffbenite formation parameter $P_{jb}$ evaluates a maximum amount of jeffbenite crystalline phase in the material in terms of mole percent of oxides, assuming the formula of the phase to be approximately $R^{2+}{}_3Al_2R^{4+}{}_3O_{12}$, or $3R^{2+}O \cdot Al_2O_3 \cdot 3R^{4+}O_2$, where $R^{2+}$ is one or more of $Mg_2^+$, $Mn_2^+$ and $Fe_2^+$, $R^{4+}$ is one or more of $Si_4^+ \cdot Zr^{4+}$ and $Sn_4^+$, and the expression "min(X1, X2, X3)" means the least value of variables X1, X2 and X3.

For example, if the sum of MgO, MnO and FeO in mole percent is 30 mol. %, the sum of $SiO_2$, $ZrO_2$ and $SnO_2$ in mole percent is 35 mol. %, and the content of $Al_2O_3$ is 11 mol. %, the value of $P_{jb}$ is equal to 7*min(30/3, 11, 35/3) =7*10=70 (mol. %), which means that 70 mol. % of oxides containing in the glass composition may potentially form a jeffbenite crystalline phase. Not being bounded to any theory, it is assumed that the greater the value of $P_{jb}$, the more amount of the phase can potentially be formed. However, if the value of $P_{jb}$ is too high, the amount of the residual glass phase may become too small, which may potentially cause some loss of transmittance of the resulting glass-ceramic. Accordingly, in the aspects, the value of $P_{jb}$ is preferably limited.

Density $d_{RT}$ is a property of glass that can be predicted from the glass composition. A linear regression analysis of the Exemplary Glasses of the present disclosure in the EXAMPLES section below and other glass compositions reported in the literature was performed to determine an equation that can predict the composition dependence of the density.

The training dataset of glass compositions satisfying the criteria specified in Table 1 below and having measured values of the properties of interest, about 100 glass compositions for a property (density), was randomly selected from the literature data presented in the publicly available SciGlass Information System database and from the Exemplary Glasses from the disclosure presented herein. The linear regression analysis on the above-specified dataset was used to determine the formulas, with the exclusion of insignificant variables and outliers. The resulting formula is presented in Table 2 below. Another part of glass compositions satisfying the same criteria was used as a validation set to evaluate the ability to interpolate within predefined compositional limits, which corresponds to the standard deviations specified in the Table 2. An external dataset of prior art glass compositions, also randomly selected from the SciGlass Information System database, was used to evaluate the ability to predict the properties outside of the specified compositional limits with a reasonable accuracy. Multiple iterations of this process were performed in order to determine the best variant for a property, corresponding to the above-mentioned regression formula specified in the Table 2.

The data for the Comparative Glass compositions used in the linear regression modeling, including the training dataset, validation dataset and external dataset were obtained from the publicly available SciGlass Information System database. Formula (II) below was obtained from the linear regression analysis and used to predict the density of the glasses:

$P_d = 2.887 - 0.0072823*SiO_2 + 0.0051002*MgO - 0.0018062*Al_2O_3 + 0.025136*ZrO_2 - 0.0014332*K_2O + 0.0092523*TiO_2 + 0.020819*ZnO + 0.036644*BaO + 0.017682*FeO + 0.0071329*MnO + 0.0091327*MnO_2 +$
$0.011077*CaO + 0.024475*SrO + 0.044972*Cs_2O + 0.00053066*Li_2O - 0.012312*P_2O_5 + 0.083043*La_2O_3 - 0.0074883*B_2O_3 + 0.059360*Y_2O_3 + 0.069507*PbO + 0.056896*HfO_2.$  (II)

In Formula (II) and Tables 1 and 2, $P_d$ is a parameter that predicts the density at room temperature [g/cm³], calculated from the components of the glass composition expressed in mol. %.

In Formula (II), each component of the glass composition is listed in terms of its chemical formula, where the chemical formula refers to the concentration of the component expressed in mol. %. For example, for purposes of Formula (II), $SiO_2$ refers to the concentration of $SiO_2$, expressed in mol. %, in the glass composition. It is understood that not all components listed in Formula (II) are necessarily present in a particular glass composition and that Formula (II) are equally valid for glass compositions that contain less than all of the components listed in the formulas. It is further understood that Formula (II) are also valid for glass compositions within the scope and claims of the present disclosure that contain components in addition to the components listed in the formulas. If a component listed in Formula (II) is absent in a particular glass composition, the concentration of the component in the glass composition is 0 mol. % and the contribution of the component to the value calculated from the formulas is zero.

TABLE 1

Composition Space Used for Modeling

| Property | $d_{RT}$, g/cm³ | |
| --- | --- | --- |
| Component limits | Min, mol. % | Max, mol. % |
| $SiO_2$ | 35 | 65 |
| MgO | 10 | 45 |
| $Al_2O_3$ | 5 | 20 |
| $ZrO_2 + TiO_2$ | 0.5 | 15 |
| $Na_2O$ | 0 | 15 |
| $K_2O$ | 0 | 15 |
| ZnO | 0 | 12 |
| FeO | 0 | 10 |
| $MnO + MnO_2$ | 0 | 1.5 |
| CaO + SrO | 0 | 3 |
| $Cs_2O$ | 0 | 5 |
| $Li_2O$ | 0 | 10 |
| $P_2O_5$ | 0 | 5 |

TABLE 1-continued

Composition Space Used for Modeling

| Property | $d_{RT}$, g/cm³ | |
| --- | --- | --- |
| Component limits | Min, mol. % | Max, mol. % |
| $La_2O_3$ | 0 | 10 |
| $ZrO_2$ | 0 | 10 |
| $TiO_2$ | 0 | 10 |
| Other species | 0 | Not limited |

TABLE 2

Property prediction model

| Property | Abbreviation | Unit | Predicting Parameter | Regression Formula | Composition Unit | Standard Deviation |
| --- | --- | --- | --- | --- | --- | --- |
| Density at room temperature | $d_{RT}$ | g/cm³ | $P_d$ | Formula (II) | Mol. % | 0.028 |

FIG. 1 is a plot of the parameter $P_d$ calculated by Formula (II) as a function of measured density $d_{RT}$ for some Literature Glasses ("Comp. Glasses") and some Exemplary Glasses ("Ex. Glasses"). As illustrated by the data in FIG. 1, the compositional dependence of the parameter $P_d$ had an error within a range of ±0.028 unit of the measured $d_{RT}$ for the majority of glasses, that corresponds to the standard error specified in Table 2.

Table 3 identifies the combination of components and their respective amounts according to an aspect of the present disclosure. The Exemplary Glasses A in Table 3 may include additional components according to any aspects of the present disclosure as described herein.

TABLE 3

Exemplary Glasses A

| Component | Amount (mol. %) |
| --- | --- |
| $SiO_2$ | 36.0 to 75.0 mol. % |
| MgO | 13.0 to 50.0 mol. % |
| $Al_2O_3$ | 2.0 to 12.1 mol. % |
| $Y_2O_3$ | 0.0 to 7.0 mol. % |
| Sum of ($ZrO_2$ + $HfO_2$ + $TiO_2$) | 1.5 to 9.0 mol. % |

Exemplary Glasses A may optionally fluorine (F) in an amount 0.0 to 1.0 at. %.

Exemplary Glasses A may also satisfy the following condition:

$R_2O - Al_2O_3$[mol. %]≤9.0, where chemical formulas refer to the amounts of components in glass, expressed in mol. %.

Exemplary Glasses A may also satisfy the following condition:

$SiO_2 - Al_2O_3 - R_2O$[mol. %]≤38.5, where chemical formulas refer to the amounts of components in glass, expressed in mol. %.

Exemplary Glasses A may also satisfy the following condition:

$MgO/RO$[mol. %]≤0.72, where chemical formulas refer to the amounts of components in glass, expressed in mol. %.

Table 4 identifies the combination of components and their respective amounts according to an aspect of the present disclosure. The Exemplary Glasses B in Table 4 may include additional components according to any aspects of the present disclosure as described herein.

TABLE 4

Exemplary Glasses B

| Component | Amount (mol. %) |
|---|---|
| $SiO_2$ | 25.0 to 75.0 mol. % |
| $Al_2O_3$ | 7.4 to 14.1 mol. % |
| $Na_2O$ | 0.0 to 10.0 mol. % |
| $Y_2O_3$ | 0.0 to 7.0 mol. % |
| Total sum of divalent metal oxides RO | 5.0 to 55.0 mol. % |
| Sum of ($ZrO_2$ + $HfO_2$) | 1.5 to 9.5 mol. % |

Exemplary Glasses B may be substantially free of fluorine.

Exemplary Glasses B may also satisfy the following condition:

$$R_2O\text{-}Al_2O_3[\text{mol. \%}] \leq 3.0,$$

where chemical formulas refer to the amounts of components in glass, expressed in mol. %.

Exemplary Glasses B may also satisfy the following condition:

$$SiO_2\text{-}Al_2O_3\text{-}R_2O[\text{mol. \%}] \leq 43.6,$$

where chemical formulas refer to the amounts of components in glass, expressed in mol. %.

Exemplary Glasses B may also satisfy the following condition:

$$MgO/RO[\text{mol. \%}] \leq 0.71,$$

where chemical formulas refer to the amounts of components in glass, expressed in mol. %.

Table 5 identifies the combination of components and their respective amounts according to an aspect of the present disclosure. The Exemplary Glasses C in Table 5 may include additional components as described herein.

TABLE 5

Exemplary Glasses C

| Component | Amount (mol. %) |
|---|---|
| $SiO_2$ | 20.0 to 80.0 mol. % |
| MgO | 13.0 to 50.0 mol. % |
| $Al_2O_3$ | 0.5 to 12.1 mol. % |
| FeO + 2*$Fe_2O_3$ | 0.0 to 18.0 mol. % |
| $Li_2O$ | 0.0 to 7.0 mol. % |
| $TiO_2$ | 0.0 to 5.5 mol. % |
| Sum of ($ZrO_2$ + $HfO_2$ + $TiO_2$) | ≥1.5 mol. % |
| Sum of ($Na_2O$ + $K_2O$) | 0.0 to 18.0 mol. % |

Exemplary Glasses C may optionally fluorine (F) in an amount 0.0 to 1.0 at. %.

Exemplary Glasses C may also satisfy the following condition:

$$SiO_2\text{-}Al_2O_3\text{-}R_2O[\text{mol. \%}] \leq 38.5,$$

where chemical formulas refer to the amounts of components in glass, expressed in mol. %.

Exemplary Glasses C may also satisfy the following condition:

$$MgO/RO[\text{mol. \%}] \leq 0.725,$$

where chemical formulas refer to the amounts of components in glass, expressed in mol. %.

Exemplary Glasses C may also satisfy the following formula:

$$d_{RT}-(3.38-0.016*(SiO_2\text{-}Al_2O_3\text{-}R_2O))<0.000,$$

where $d_{RT}$ is a density at room temperature.

Exemplary Glasses C may also satisfy the following formula:

$$d_{RT}-(3.35-0.016*(SiO_2\text{-}Al_2O_3\text{-}R_2O))<0.000,$$

where $d_{RT}$ is a density at room temperature.

EXAMPLES

The following examples describe various features and advantages provided by the disclosure, and are in no way intended to limit the invention and appended claims.

Table 6 shows example glass and glass-ceramic compositions (in terms of mol. %), the ceram schedule for achieving glass-ceramic articles, and the respective properties of the glasses and glass-ceramic articles. Individual samples were formed by melting a batch of constituent components to form the glass having the indicated composition. The molten glass was then poured into a steel mold and cooled to form pucks. Pucks of the glass were sectioned and then heat treated to form the glass-ceramic. Samples of the glass-ceramic were approximately 1 cm thick (unless otherwise specified). Properties of the glass-ceramics were then determined including the crystalline phases, the appearance of the sample, the % volume decrease upon crystallization of the sample (i.e., the shrinkage), the glass density, the glass-ceramic (GC) density, the % increase in density, the elastic modulus, the Shear Modulus, Poisson's ratio, fracture toughness, and Vickers hardness. When describing the appearance of the samples, the term "white" refers to glass-ceramics that were white and opaque. The term "opal" refers to glass-ceramics that were white and slightly translucent. The term "transparent opal" refers to glass-ceramics that were white but more translucent.

TABLE 6

| Exemplary Glass Compositions | | | | | | | | | |
|---|---|---|---|---|---|---|---|---|---|
| Exemplary Glass | | 1 | 2 | 3 | 4 | 5 | 6 | 7 | 8 |
| Composition - mol. % | | | | | | | | | |
| $SiO_2$ | mol. % | 53.91 | 54.46 | 48.59 | 48.48 | 46.05 | 45.93 | 46.44 | 47.15 |
| MgO | mol. % | 22.30 | 23.36 | 32.25 | 32.16 | 35.23 | 35.16 | 33.50 | 34.02 |
| $Al_2O_3$ | mol. % | 10.77 | 9.18 | 9.88 | 9.86 | 11.21 | 11.18 | 11.26 | 11.43 |
| $K_2O$ | mol. % | 10.67 | 4.75 | 3.16 | 3.15 | 2.10 | 2.10 | 2.09 | 1.94 |

TABLE 6-continued

Exemplary Glass Compositions

| | | | | | | | | | |
|---|---|---|---|---|---|---|---|---|---|
| Na$_2$O | mol. % | 0.0631 | 4.65 | 3.23 | 3.23 | 2.10 | 2.09 | 2.27 | 2.58 |
| TiO$_2$ | mol. % | 0.0082 | 0.37 | 0 | 0.72 | 0 | 0.71 | 0.70 | 0 |
| ZrO$_2$ | mol. % | 1.99 | 3.11 | 2.79 | 2.32 | 3.21 | 2.75 | 3.65 | 2.78 |
| CaO | mol. % | 0.17 | 0 | 0 | 0 | 0 | 0 | 0 | 0 |
| SnO$_2$ | mol. % | 0.0995 | 0.12 | 0.095 | 0.0947 | 0.0939 | 0.0936 | 0.0933 | 0.0948 |
| Fe$_2$O$_3$ | mol. % | 0.0102 | 0 | 0 | 0 | 0 | 0 | 0 | 0 |
| As$_2$O$_3$ | mol. % | 3.30E-4 | 0 | 0 | 0 | 0 | 0 | 0 | 0 |

Composition constraints

| | | | | | | | | | |
|---|---|---|---|---|---|---|---|---|---|
| ZrO$_2$ + HfO$_2$ + TiO$_2$ | mol. % | 2.002 | 3.474 | 2.788 | 3.032 | 3.214 | 3.454 | 4.355 | 2.782 |
| R$_2$O − Al$_2$O$_3$ | mol. % | −0.03843 | 0.2220 | −3.486 | −3.483 | −7.010 | −6.988 | −6.901 | −6.908 |
| SiO$_2$ − Al$_2$O$_3$ − R$_2$O | mol. % | 32.40 | 35.88 | 32.32 | 32.24 | 30.64 | 30.56 | 30.82 | 31.20 |
| MgO/RO | mol. % | 0.9922 | 1.000 | 1.000 | 1.000 | 1.000 | 1.000 | 1.000 | 1.000 |
| ZrO$_2$ + HfO$_2$ | mol. % | 1.994 | 3.105 | 2.788 | 2.317 | 3.214 | 2.748 | 3.651 | 2.782 |
| FeO + 2 * Fe$_2$O$_3$ | mol. % | 0.02041 | 0 | 0 | 0 | 0 | 0 | 0 | 0 |
| Na$_2$O + K$_2$O | mol. % | 10.73 | 9.402 | 6.393 | 6.378 | 4.202 | 4.191 | 4.358 | 4.521 |

Measured properties

| | | | | | | | | | |
|---|---|---|---|---|---|---|---|---|---|
| d$_{RT}$ | g/cm$^3$ | | 2.650 | 2.721 | 2.718 | 2.771 | 2.772 | 2.763 | 2.742 |
| n$_d$ | | | 1.5581 | | | | | | |
| E | Gpa | 78.603 | 89.497 | 93.358 | 96.806 | | 112.87 | | |
| Ceramming schedule | T [° C.] - hours | | 725-4, 850-2 | 750-4, 800-4 | 750-4, 800-4 | 750-4, 850-4 | 750-4, 825-4 | 770-4, 820-4 | 780-4, 850-4 |
| GC Appearance | | | Translucent | Translucent | Translucent | Opaque, white | Opaque, white | Opaque, white | phase separated, translucent |
| Primary Phase | | | Jeffbenite | ZrO2 | Jeffbenite | Jeffbenite, ZrO2 | Jeffbenite | Jeffbenite | ZrO2 |

Predicted and calculated properties

| | | | | | | | | | |
|---|---|---|---|---|---|---|---|---|---|
| P$_{jb}$ | mol. % | 52.038 | 54.518 | 69.178 | 69.004 | 78.463 | 78.268 | 78.161 | 79.371 |
| P$_d$ [for d$_{RT}$] | g/cm$^3$ | 2.6256 | 2.6676 | 2.7453 | 2.7406 | 2.7889 | 2.7842 | 2.7947 | 2.7636 |
| P$_d$ − (3.38 − 0.016 * (SiO$_2$ − Al$_2$O$_3$ − R$_2$O)) | | −0.2360 | −0.1383 | −0.1175 | −0.1237 | −0.1010 | −0.1068 | −0.0923 | −0.1171 |
| P$_d$ − (3.35 − 0.016 * (SiO$_2$ − Al$_2$O$_3$ − R$_2$O)) | | −0.2060 | −0.1083 | −0.0875 | −0.0937 | −0.0710 | −0.0768 | −0.0623 | −0.0871 |

| Exemplary Glass | | 9 | 10 | 11 | 12 | 13 | 14 | 15 | 16 |
|---|---|---|---|---|---|---|---|---|---|

Composition - mol. %

| | | | | | | | | | |
|---|---|---|---|---|---|---|---|---|---|
| SiO$_2$ | mol. % | 48.68 | 45.33 | 41.60 | 47.95 | 50.66 | 46.60 | 48.02 | 43.74 |
| MgO | mol. % | 32.02 | 38.27 | 45.10 | 31.72 | 28.88 | 33.48 | 33.64 | 39.55 |
| Al$_2$O$_3$ | mol. % | 10.07 | 8.71 | 9.47 | 11.59 | 8.43 | 11.25 | 8.61 | 8.99 |
| K$_2$O | mol. % | 3.11 | 2.05 | 0 | 1.81 | 4.26 | 1.61 | 3.11 | 2.17 |
| Na$_2$O | mol. % | 3.24 | 2.07 | 0 | 2.75 | 4.26 | 2.81 | 3.18 | 2.36 |
| TiO$_2$ | mol. % | 0 | 1.39 | 1.42 | 1.78 | 1.08 | 1.41 | 1.12 | 0.73 |
| ZrO$_2$ | mol. % | 2.79 | 2.09 | 2.31 | 2.31 | 2.33 | 2.74 | 2.23 | 2.37 |
| SnO$_2$ | mol. % | 0.0951 | 0.0969 | 0.0943 | 0.0943 | 0.11 | 0.0933 | 0.0991 | 0.0969 |

Composition constraints

| | | | | | | | | | |
|---|---|---|---|---|---|---|---|---|---|
| ZrO$_2$ + HfO$_2$ + TiO$_2$ | mol. % | 2.793 | 3.477 | 3.727 | 4.084 | 3.402 | 4.146 | 3.352 | 3.100 |
| R$_2$O − Al$_2$O$_3$ | mol. % | −3.726 | −4.589 | −9.473 | −7.029 | 0.08554 | −6.828 | −2.322 | −4.465 |
| SiO$_2$ − Al$_2$O$_3$ − R$_2$O | mol. % | 32.27 | 32.50 | 32.13 | 31.80 | 33.72 | 30.92 | 33.12 | 30.22 |
| MgO/RO | mol. % | 1.000 | 1.000 | 1.000 | 1.000 | 1.000 | 1.000 | 1.000 | 1.000 |
| ZrO$_2$ + HfO$_2$ | mol. % | 2.793 | 2.087 | 2.305 | 2.306 | 2.326 | 2.738 | 2.230 | 2.369 |
| Na$_2$O + K$_2$O | mol. % | 6.343 | 4.121 | 0 | 4.560 | 8.516 | 4.425 | 6.288 | 4.526 |

TABLE 6-continued

Exemplary Glass Compositions

Measured properties

| | | | | | | | | | |
|---|---|---|---|---|---|---|---|---|---|
| $d_{RT}$ | g/cm³ | 2.721 | 2.777 | 2.898 | 2.738 | 2.677 | 2.762 | | |
| $n_d$ | | 1.5901 | | | | | 1.6185 | | |
| E | Gpa | 107.84 | | | 117.70 | 97.771 | 120.94 | 108.18 | 121.49 |
| Ceramming schedule | T [° C.] - hours | 780-4, 900-4 | 780-4, 900-4 | 780-4, 850-4 | 780-4, 900-4 | 775-4, 850-4 | 800-4, 900-4 | 780-4, 850-4 | 780-4, 850-4 |
| GC Appearance | | Opaque, white | Opaque, white | opaque, white | Opaque, white | Opaque, white | Opaque, white | Opaque, white | Opaque, white |
| Primary Phase | | Jeffbenite | Jeffbenite | Jeffbenite | Jeffbenite | Jeffbenite | Jeffbenite | Jeffbenite | Jeffbenite |

Predicted and calculated properties

| | | | | | | | | | |
|---|---|---|---|---|---|---|---|---|---|
| $P_{jb}$ | mol. % | 70.481 | 60.977 | 66.303 | 74.017 | 59.034 | 78.126 | 60.277 | 62.940 |
| $P_d$ [for $d_{RT}$] | g/cm³ | 2.7433 | 2.7988 | 2.8681 | 2.7505 | 2.7124 | 2.7776 | 2.7553 | 2.8172 |
| $P_d - (3.38 - 0.016 * (SiO_2 - Al_2O_3 - R_2O))$ | | −0.1204 | −0.0613 | 0.0021 | −0.1207 | −0.1281 | −0.1076 | −0.0948 | −0.0793 |
| $P_d - (3.35 - 0.016 * (SiO_2 - Al_2O_3 - R_2O))$ | | −0.0904 | −0.0313 | 0.0321 | −0.0907 | −0.0981 | −0.0776 | −0.0648 | −0.0493 |

| Exemplary Glass | | 17 | 18 | 19 | 20 | 21 | 22 | 23 | 24 |
|---|---|---|---|---|---|---|---|---|---|

Composition - mol. %

| | | | | | | | | | |
|---|---|---|---|---|---|---|---|---|---|
| $SiO_2$ | mol. % | 42.40 | 42.81 | 45.05 | 42.87 | 52.64 | 54.44 | 46.60 | 50.47 |
| MgO | mol. % | 36.76 | 35.74 | 29.26 | 37.05 | 26.18 | 23.36 | 33.51 | 29.52 |
| $Al_2O_3$ | mol. % | 11.34 | 12.88 | 9.66 | 11.45 | 8.21 | 9.18 | 11.31 | 9.67 |
| $K_2O$ | mol. % | 0 | 0 | 1.44 | 2.87 | 4.24 | 5.33 | 0 | 1.70 |
| ZnO | mol. % | 0 | 0 | 8.05 | 0 | 0 | 0 | 0 | 0 |
| $Na_2O$ | mol. % | 3.79 | 4.20 | 2.95 | 0 | 4.18 | 4.10 | 2.79 | 3.68 |
| $TiO_2$ | mol. % | 2.11 | 1.44 | 1.11 | 1.39 | 0.31 | 0.37 | 1.39 | 0.77 |
| $ZrO_2$ | mol. % | 3.52 | 2.85 | 2.39 | 4.29 | 4.11 | 3.12 | 2.70 | 4.10 |
| BaO | mol. % | 0 | 0 | 0 | 0 | 0 | 0 | 1.61 | 0 |
| $SnO_2$ | mol. % | 0.0799 | 0.0803 | 0.0978 | 0.0816 | 0.12 | 0.12 | 0.0819 | 0.0818 |

Composition constraints

| | | | | | | | | | |
|---|---|---|---|---|---|---|---|---|---|
| $ZrO_2 + HfO_2 + TiO_2$ | mol. % | 5.630 | 4.290 | 3.500 | 5.675 | 4.418 | 3.484 | 4.093 | 4.874 |
| $R_2O - Al_2O_3$ | mol. % | −7.549 | −8.685 | −5.271 | −8.581 | 0.2173 | 0.2477 | −8.526 | −4.293 |
| $SiO_2 - Al_2O_3 - R_2O$ | mol. % | 27.27 | 25.73 | 31.00 | 28.54 | 36.01 | 35.84 | 32.51 | 35.42 |
| MgO/RO | mol. % | 1.000 | 1.000 | 0.7843 | 1.000 | 1.000 | 1.000 | 0.9542 | 1.000 |
| $ZrO_2 + HfO_2$ | mol. % | 3.519 | 2.849 | 2.393 | 4.290 | 4.105 | 3.115 | 2.703 | 4.102 |
| $Na_2O + K_2O$ | mol. % | 3.790 | 4.199 | 4.390 | 2.871 | 8.424 | 9.425 | 2.786 | 5.381 |

Measured properties

| | | | | | | | | | |
|---|---|---|---|---|---|---|---|---|---|
| $d_{RT}$ | g/cm³ | 2.853 | 2.803 | 2.916 | 2.855 | | | | 2.753 |
| $n_d$ | | | | 1.6099 | | | 1.5579 | | |
| E | Gpa | | 124.94 | 119.70 | | | | | 112.87 |
| Ceramming schedule | T [° C.] - hours | 780-4, 850-4 | 780-4, 850-4 | | 780-4, 850-4 | | 750-5, 850-4 | | 780-4, 850-4 |
| GC Appearance | | Translucent Opal | Opaque, white | | Translucent, opal | | Translucent | | Opaque opalish |
| Primary Phase | | Jeffbenite | Jeffbenite | | Jeffbenite | | Jeffbenite | | Jeffbenite |

Predicted and calculated properties

| | | | | | | | | | |
|---|---|---|---|---|---|---|---|---|---|
| $P_{jb}$ | mol. % | 79.387 | 83.393 | 67.610 | 80.174 | 57.449 | 54.514 | 78.199 | 67.709 |
| $P_d$ [for $d_{RT}$] | g/cm³ | 2.8532 | 2.8192 | 2.9265 | 2.8597 | 2.7224 | 2.6672 | 2.8379 | 2.7603 |
| $P_d - (3.38 - 0.016 * (SiO_2 - Al_2O_3 - R_2O))$ | | −0.0905 | −0.1492 | 0.0425 | −0.0636 | −0.0815 | −0.1394 | −0.0220 | −0.0530 |
| $P_d - (3.35 - 0.016 * (SiO_2 - Al_2O_3 - R_2O))$ | | −0.0605 | −0.1192 | 0.0725 | −0.0336 | −0.0515 | −0.1094 | 0.0080 | −0.0230 |

TABLE 6-continued

Exemplary Glass Compositions

| Exemplary Glass | | 25 | 26 | 27 | 28 | 29 | 30 | 31 | 32 |
|---|---|---|---|---|---|---|---|---|---|
| Composition - mol. % | | | | | | | | | |
| $SiO_2$ | mol. % | 45.94 | 53.07 | 52.38 | 46.71 | 50.37 | 52.23 | 53.07 | 50.09 |
| MgO | mol. % | 33.33 | 25.32 | 26.34 | 26.43 | 29.21 | 26.21 | 25.16 | 29.66 |
| $Al_2O_3$ | mol. % | 10.94 | 9.34 | 9.43 | 8.82 | 9.61 | 9.38 | 9.94 | 9.72 |
| $K_2O$ | mol. % | 1.31 | 3.73 | 3.18 | 1.90 | 1.70 | 3.72 | 1.76 | 1.71 |
| ZnO | mol. % | 0 | 0 | 0 | 7.37 | 0 | 0 | 0 | 0 |
| $Na_2O$ | mol. % | 2.98 | 4.35 | 4.23 | 3.09 | 3.68 | 3.73 | 3.70 | 3.70 |
| $TiO_2$ | mol. % | 0.77 | 0.55 | 0.55 | 1.20 | 1.54 | 1.17 | 2.40 | 1.01 |
| $ZrO_2$ | mol. % | 4.65 | 3.56 | 3.80 | 4.40 | 3.80 | 3.45 | 3.93 | 3.12 |
| $P_2O_5$ | mol. % | 0 | 0 | 0 | 0 | 0 | 0 | 0 | 1.00 |
| $SnO_2$ | mol. % | 0.0818 | 0.0831 | 0.0829 | 0.0847 | 0.0818 | 0 | 0.0423 | 0 |
| $SeO_2$ | mol. % | 0 | 0 | 0 | 0 | 0 | 0.11 | 0 | 0 |
| Composition constraints | | | | | | | | | |
| $ZrO_2 + HfO_2 + TiO_2$ | mol. % | 5.421 | 4.108 | 4.348 | 5.598 | 5.345 | 4.623 | 6.328 | 4.124 |
| $R_2O - Al_2O_3$ | mol. % | -6.650 | -1.269 | -2.018 | -3.838 | -4.232 | -1.932 | -4.480 | -4.312 |
| $SiO_2 - Al_2O_3 - R_2O$ | mol. % | 30.71 | 35.66 | 35.53 | 32.91 | 35.38 | 35.40 | 37.66 | 34.97 |
| MgO/RO | mol. % | 1.000 | 1.000 | 1.000 | 0.7820 | 1.000 | 1.000 | 1.000 | 1.000 |
| $ZrO_2 + HfO_2$ | mol. % | 4.650 | 3.559 | 3.801 | 4.400 | 3.802 | 3.450 | 3.933 | 3.116 |
| $Na_2O + K_2O$ | mol. % | 4.290 | 8.071 | 7.414 | 4.984 | 5.381 | 7.448 | 5.464 | 5.406 |
| Measured properties | | | | | | | | | |
| $d_{RT}$ | g/cm³ | 2.827 | 2.686 | 2.705 | | 2.753 | | | |
| E | Gpa | | 96.323 | 99.50 | | 110.60 | | | |
| Ceramming schedule | T [° C.] - hours | 780-4, 850-4 | 780-4, 850-4 | 780-4, 850-4 | | 750-4, 825-4 | | | |
| GC Appearance | | phase separated, opaque | translucent, opal | translucent, opal | | translucent | | | |
| Primary Phase | | Jeffbenite | Jeffbenite | Jeffbenite | | Jeffbenite | | | |
| Predicted and calculated properties | | | | | | | | | |
| $P_{jb}$ | mol. % | 76.565 | 59.112 | 61.460 | 61.673 | 67.284 | 61.158 | 58.698 | 68.027 |
| $P_d$ [for $d_{RT}$] | g/cm³ | 2.8248 | 2.7021 | 2.7189 | 2.938 | 2.7592 | 2.7157 | 2.7294 | 2.7288 |
| $P_d - (3.38 - 0.016 * (SiO_2 - Al_2O_3 - R_2O))$ | | -0.0639 | -0.1074 | -0.0925 | 0.0846 | -0.0548 | -0.0980 | -0.0481 | -0.0918 |
| $P_d - (3.35 - 0.016 * (SiO_2 - Al_2O_3 - R_2O))$ | | -0.0339 | -0.0774 | -0.0625 | 0.1146 | -0.0248 | -0.0680 | -0.0181 | -0.0618 |

| Exemplary Glass | | 33 | 34 | 35 | 36 | 37 | 38 | 39 | 40 |
|---|---|---|---|---|---|---|---|---|---|
| Composition - mol. % | | | | | | | | | |
| $SiO_2$ | mol. % | 52.16 | 49.73 | 59.92 | 55.57 | 53.76 | 54.38 | 53.76 | 56.55 |
| MgO | mol. % | 26.28 | 26.37 | 20.51 | 18.66 | 18.78 | 18.73 | 21.19 | 16.30 |
| $Al_2O_3$ | mol. % | 9.41 | 8.64 | 8.11 | 11.06 | 11.84 | 11.81 | 10.52 | 11.92 |
| $K_2O$ | mol. % | 3.73 | 1.33 | 4.12 | 5.71 | 5.75 | 5.73 | 5.25 | 5.79 |
| ZnO | mol. % | 0 | 7.22 | 0 | 0 | 0 | 0 | 0 | 0 |
| $Na_2O$ | mol. % | 3.74 | 2.72 | 4.14 | 5.75 | 6.11 | 6.09 | 5.28 | 6.15 |
| $TiO_2$ | mol. % | 0.78 | 1.02 | 0.39 | 0.32 | 0.82 | 0.33 | 0.80 | 0.33 |
| $ZrO_2$ | mol. % | 3.82 | 2.89 | 2.69 | 2.79 | 2.81 | 2.80 | 3.07 | 2.83 |
| $SnO_2$ | mol. % | 0.0832 | 0.083 | 0.12 | 0.13 | 0.13 | 0.13 | 0.13 | 0.13 |
| Composition constraints | | | | | | | | | |
| $ZrO_2 + HfO_2 + TiO_2$ | mol. % | 4.600 | 3.909 | 3.085 | 3.113 | 3.624 | 3.125 | 3.878 | 3.156 |
| $R_2O - Al_2O_3$ | mol. % | -1.937 | -4.594 | 0.1572 | 0.4020 | 0.01650 | 0.01647 | 0.01559 | 0.01662 |
| $SiO_2 - Al_2O_3 - R_2O$ | mol. % | 35.29 | 37.03 | 43.55 | 33.04 | 30.07 | 30.75 | 32.71 | 32.68 |
| MgO/RO | mol. % | 1.000 | 0.7850 | 1.000 | 1.000 | 1.000 | 1.000 | 1.000 | 1.000 |
| $ZrO_2 + HfO_2$ | mol. % | 3.815 | 2.892 | 2.693 | 2.789 | 2.807 | 2.799 | 3.074 | 2.827 |
| $Na_2O + K_2O$ | mol. % | 7.468 | 4.050 | 8.263 | 11.47 | 11.86 | 11.82 | 10.53 | 11.94 |
| Predicted and calculated properties | | | | | | | | | |
| $P_{jb}$ | mol. % | 61.326 | 60.509 | 47.846 | 43.538 | 43.826 | 43.704 | 49.441 | 38.044 |
| $P_d$ [for $d_{RT}$] | g/cm³ | 2.722 | 2.8742 | 2.606 | 2.6224 | 2.6398 | 2.6303 | 2.6618 | 2.6026 |
| $P_d - (3.38 - 0.016 * (SiO_2 - Al_2O_3 - R_2O))$ | | -0.0934 | 0.0868 | -0.0772 | -0.2289 | -0.2592 | -0.2577 | -0.1949 | -0.2545 |
| $P_d - (3.35 - 0.016 * (SiO_2 - Al_2O_3 - R_2O))$ | | -0.0634 | 0.1168 | -0.0472 | -0.1989 | -0.2292 | -0.2277 | -0.1649 | -0.2245 |

TABLE 6-continued

Exemplary Glass Compositions

| Exemplary Glass | | 41 | 42 | 43 | 44 | 45 | 46 | 47 | 48 |
|---|---|---|---|---|---|---|---|---|---|
| Composition - mol. % | | | | | | | | | |
| $SiO_2$ | mol. % | 57.67 | 54.71 | 48.51 | 52.19 | 39.99 | 55.41 | 54.57 | 53.60 |
| MgO | mol. % | 15.07 | 23.08 | 26.36 | 26.27 | 46.60 | 18.55 | 18.76 | 18.72 |
| $Al_2O_3$ | mol. % | 11.72 | 9.19 | 11.88 | 9.40 | 6.71 | 11.03 | 11.95 | 12.99 |
| $K_2O$ | mol. % | 4.69 | 4.82 | 3.30 | 1.74 | 0 | 5.66 | 5.67 | 5.64 |
| $Na_2O$ | mol. % | 7.03 | 4.56 | 3.76 | 3.75 | 0 | 5.77 | 5.78 | 5.82 |
| $TiO_2$ | mol. % | 0 | 0.41 | 0.81 | 0.79 | 2.70 | 0.33 | 0.33 | 0.33 |
| $ZrO_2$ | mol. % | 3.70 | 0 | 3.79 | 3.77 | 4.01 | 3.11 | 2.80 | 2.77 |
| $HfO_2$ | mol. % | 0 | 3.09 | 0 | 0 | 0 | 0 | 0 | 0 |
| SrO | mol. % | 0 | 0 | 0 | 2.00 | 0 | 0 | 0 | 0 |
| $P_2O_5$ | mol. % | 0 | 0 | 1.51 | 0 | 0 | 0 | 0 | 0 |
| $SnO_2$ | mol. % | 0.13 | 0.13 | 0.086 | 0.0834 | 0 | 0.13 | 0.13 | 0.13 |
| Composition constraints | | | | | | | | | |
| $ZrO_2 + HfO_2 + TiO_2$ | mol. % | 3.696 | 3.504 | 4.596 | 4.561 | 6.705 | 3.439 | 3.130 | 3.096 |
| $R_2O - Al_2O_3$ | mol. % | 6.454E-03 | 0.1888 | -4.817 | -3.913 | -6.706 | 0.3980 | -0.4961 | -1.534 |
| $SiO_2 - Al_2O_3 - R_2O$ | mol. % | 34.23 | 36.15 | 29.57 | 37.31 | 33.29 | 32.95 | 31.15 | 29.15 |
| MgO/RO | mol. % | 1.000 | 1.000 | 1.000 | 0.9292 | 1.000 | 1.000 | 1.000 | 1.000 |
| $ZrO_2 + HfO_2$ | mol. % | 3.696 | 3.092 | 3.785 | 3.774 | 4.006 | 3.114 | 2.804 | 2.768 |
| $Na_2O + K_2O$ | mol. % | 11.72 | 9.378 | 7.063 | 5.486 | 0 | 11.43 | 11.46 | 11.46 |
| Predicted and calculated properties | | | | | | | | | |
| $P_{jb}$ | mol. % | 35.152 | 53.861 | 61.499 | 61.306 | 46.939 | 43.293 | 43.773 | 43.670 |
| $P_d$ [for $d_{RT}$] | g/cm$^3$ | 2.6089 | 2.7625 | 2.7261 | 2.7726 | 2.947 | 2.6313 | 2.6291 | 2.6332 |
| $P_d - (3.38 - 0.016 * (SiO_2 - Al_2O_3 - R_2O))$ | | -0.2234 | -0.0391 | -0.1808 | -0.0105 | 0.0996 | -0.2215 | -0.2525 | -0.2805 |
| $P_d - (3.35 - 0.016 * (SiO_2 - Al_2O_3 - R_2O))$ | | -0.1934 | -0.0091 | -0.1508 | 0.0195 | 0.1296 | -0.1915 | -0.2225 | -0.2505 |

| Exemplary Glass | | 49 | 50 | 51 | 52 | 53 | 54 | 55 |
|---|---|---|---|---|---|---|---|---|
| Composition - mol. % | | | | | | | | |
| SiO2 | mol. % | 57.90 | 53.71 | 47.52 | 49.04 | 50.53 | 52.15 | 52.18 |
| MgO | mol. % | 10.02 | 10.01 | 31.96 | 29.42 | 26.79 | 24.04 | 26.25 |
| $Al_2O_3$ | mol. % | 13.97 | 13.01 | 7.86 | 8.49 | 9.14 | 9.81 | 9.42 |
| $K_2O$ | mol. % | 6.98 | 5.66 | 3.91 | 4.18 | 4.52 | 4.88 | 2.76 |
| $MnO_2$ | mol. % | 0 | 8.65 | 0 | 0 | 0 | 0 | 0 |
| $Na_2O$ | mol. % | 6.96 | 5.85 | 3.93 | 4.20 | 4.58 | 4.98 | 3.77 |
| $TiO_2$ | mol. % | 1.03 | 0.34 | 4.76 | 3.86 | 2.86 | 1.81 | 0.89 |
| $ZrO_2$ | mol. % | 3.00 | 2.77 | 0 | 0.74 | 1.50 | 2.25 | 3.64 |
| $La_2O_3$ | mol. % | 0 | 0 | 0 | 0 | 0 | 0 | 1.00 |
| $SnO_2$ | mol. % | 0.14 | 0 | 0.0788 | 0.0803 | 0.0819 | 0.0835 | 0.0862 |
| Composition constraints | | | | | | | | |
| $ZrO_2 + HfO_2 + TiO_2$ | mol. % | 4.030 | 3.117 | 4.756 | 4.599 | 4.360 | 4.059 | 4.529 |
| $R_2O - Al_2O_3$ | mol. % | -0.02989 | -1.501 | -0.02561 | -0.1129 | -0.03858 | 0.03874 | -2.896 |
| $SiO_2 - Al_2O_3 - R_2O$ | mol. % | 29.99 | 29.19 | 31.82 | 32.18 | 32.29 | 32.49 | 36.23 |
| MgO/RO | mol. % | 1.000 | 0.5364 | 1.000 | 1.000 | 1.000 | 1.000 | 1.000 |
| $ZrO_2 + HfO_2$ | mol. % | 3.001 | 2.774 | 0 | 0.7365 | 1.502 | 2.247 | 3.635 |
| $Na_2O + K_2O$ | mol. % | 13.94 | 11.51 | 7.833 | 8.373 | 9.100 | 9.851 | 6.527 |
| Predicted and calculated properties | | | | | | | | |
| $P_{jb}$ | mol. % | 23.391 | 43.537 | 55.012 | 59.399 | 62.515 | 56.099 | 61.259 |
| $P_d$ [for $d_{RT}$] | g/cm$^3$ | 2.5662 | 2.6499 | 2.7282 | 2.7129 | 2.6969 | 2.6784 | 2.8023 |
| $P_d - (3.38 - 0.016 * (SiO_2 - Al_2O_3 - R_2O))$ | | -0.3340 | -0.2630 | -0.1426 | -0.1522 | -0.1665 | -0.1818 | 0.0020 |
| $P_d - (3.35 - 0.016 * (SiO_2 - Al_2O_3 - R_2O))$ | | -0.3040 | -0.2330 | -0.1126 | -0.1222 | -0.1365 | -0.1518 | 0.0320 |

Not being bounded to any theory, the Applicants believe that formation of jeffbenite phases can be facilitated if the density of residual glass matches the density of the crystalline phase.

Also, the Applicants assume that while light elements, such as silicon, magnesium and aluminum, come from the glass to the crystalline phase, the density of the residual glass increases due to increasing the content of other, heavier elements, such as titanium, zirconium and others. The increment of density appears especially high in the case when the residual glass composition includes a relatively low amount of silica, and especially when the excess of silica ($SiO_2$) over monovalent metal oxides ($R_2O$) and alumina ($Al_2O_3$) is low. Accordingly, the Applicants assume that the lower the difference ($SiO_2$—$R_2O$—$Al_2O_3$) in mol. % the more difficult is to maintain an acceptably low value of the residual glass while the ceramming process occurs. In turn, while the density of the glassy phase changes during the ceramming process, following the change of chemical composition of residual glass, the density is assumed to be correlated with the density of the glass compositions; more accurate estimate of this quantity is rather difficult to provide, as far as the exact kinetics of crystallization is poorly known.

Accordingly, the Applicants believe that it within the composition space of the present disclosure, is important to have the density of the glass acceptably low, which, however, may be difficult because of the need of adding relatively heavy components, such as, for example, $TiO_2$, $ZrO_2$, $La_2O_3$ and others to maintain a required relatively high refractive index of glass. Therefore, the Applicants anticipate a tradeoff between the requirements to the glass composition that is required to be characterized by acceptably low difference ($SiO_2$—$Al_2O_3$—$R_2O$) in mol. % needed for greater amount of formed jeffbenite phase and, at the same time, an acceptably low density needed for matching the density of glass and the density of crystalline phases when ceramming process occurs.

The present Applicants have discovered that the jeffbenite crystalline structure associated with inclusions in "super-deep" diamonds may provide many useful advantages and properties if formed in glass as a crystalline phase of glass-ceramic, as explained herein. The Applicants believe that a crystalline phase having a jeffbenite crystalline structure has never before been grown in or otherwise formed in glass-ceramic. The Applicants further believe that a crystalline phase having a jeffbenite crystalline structure has never before been formed into or otherwise incorporated into glass-ceramic articles, such as sheets of glass-ceramic, glass-ceramic containers, windows, panels, housings, plates, counters, kitchenware, rods, fibers, or other such articles. Further, in contrast to jeffbenite in (anisotropic) diamonds or in isolation, Applicants believe that crystalline phases having a jeffbenite crystalline structure have never been included in articles with isotropic material properties (e.g., properties such as the tensile strength, elasticity, and fracture toughness that remain the same when tested in different directions), as may be effectively achieved by inclusion of relatively small crystal grains, as disclosed herein, randomly-oriented and homogenously distributed within the residual glass, to form glass-ceramic, or within another isotropic solid media (e.g., polymer). Applicants believe that a crystalline phase having a jeffbenite crystalline structure has never before been manufactured as disclosed herein, even in nature, grown from precursor glasses, as disclosed herein, and at temperatures (e.g., <1600K, <1400K) and pressures (e.g., <12 Gpa, such as <10 Gpa, <8 Gpa, <1 Gpa, such as even 1 atm), as disclosed herein. Enabled by the present discoveries, large volumes of crystals having a jeffbenite crystalline structure may be now produced in a single batch, in part because extreme temperatures and pressures, associated with formation super-deep within the Earth's mantle, are unnecessary.

Furthermore, the glass-ceramics described herein may achieve hardness and stiffness values greater than other glass-ceramics, and therefore enable thinner and lighter mobile phone and tablet display faces than such glasses and glass-ceramics used in devices. The same features allow opaque or colored glass-ceramics for phone and tablet housings. Moreover, these glass-ceramics may be free of lithium and still amenable to strengthening by ion exchange.

Many variations and modifications may be made to the above-described disclosure without departing substantially from the spirit and various principles of the disclosure. All such modifications and variations are intended to be included herein within the scope of this disclosure and protected by the following claims.

To the extent not already described, the different features of the various examples of the present disclosure may be used in combination with each other as desired. That a particular feature is not explicitly illustrated or described with respect to each of the present disclosure is not meant to be construed that it cannot be, but it is done for the sake of brevity and conciseness of the description. Thus, the various features of the different examples may be mixed and matched as desired to form new examples that fall within the scope of the present disclosure and embody one or more the aspects disclosed herein, whether or not the new examples are expressly disclosed.

What is claimed is:

1. A glass comprising components, the glass having a composition of the components comprising:
   greater than or equal to 40.5 mol. % and less than or equal to 53.0 mol. % $SiO_2$,
   greater than or equal to 23.0 mol. % and less than or equal to 43.0 mol. % MgO,
   greater than or equal to 8.0 mol. % and less than or equal to 12.1 mol. % $Al_2O_3$,
   greater than or equal to 2.2 mol. % and less than or equal to 4.4 mol. % $ZrO_2$,
   greater than or equal to 0.0 mol. % and less than or equal to 7.0 mol. % $Y_2O_3$,
   greater than or equal to 0.2 mol. % and less than or equal to 2.1 mol. % $TiO_2$,
   greater than or equal to 0.0 mol. % and less than or equal to 10.0 mol. % $K_2O$,
   greater than or equal to 0.0 mol. % and less than or equal to 10.0 mol. % ZnO,
   greater than or equal to 0.0 mol. % and less than or equal to 7.5 mol. % FeO,
   greater than or equal to 0.0 mol. % and less than or equal to 7.0 mol. % BaO,
   greater than or equal to 0.0 mol. % and less than or equal to 4.4 mol. % $Na_2O$,
   greater than or equal to 0.0 mol. % and less than or equal to 1.5 mol. % SrO,
   greater than or equal to 0.0 mol. % and less than or equal to 1.5 mol. % $Y_2O_3$,
   greater than or equal to 0.0 mol. % and less than or equal to 2.0 mol. % $Ta_2O_5$,
   greater than or equal to 0 mol. % and less than or equal to 0.45 mol. % $P_2O_5$,
   greater than or equal to 0.0 at. % and less than or equal to 1.0 at. % F,
   a sum of CaO+SrO greater than or equal to 0 mol. % and less than or equal to 1.45 mol. %, and
   a sum of $ZrO_2$+$HfO_2$+$TiO_2$ is greater than or equal to 1.5 mol. % and less than or equal to 9.0 mol. %, and
   wherein the composition of the components is substantially free of $B_2O_3$; and
   wherein the glass satisfies the conditions:

$$R_2O\text{-}Al_2O_3[\text{in mol. \%}] \leq 9.0;$$

$$SiO_2\text{-}Al_2O_3\text{-}R_2O[\text{in mol. \%}] \leq 38.5; \text{ and}$$

$$MgO/RO[\text{in mol. \%}] \geq 0.72,$$

where $R_2O$ is a total of monovalent metal oxides and RO is a total of divalent metal oxides.

2. The glass of claim 1, wherein the glass satisfies the conditions:

$$40 \leq P_{jb} \leq 90,$$

where $P_{jb}$ is a value calculated from the glass composition in terms of mol. % of the components according to the following formula:

$$P_{jb}=7*\text{minimum of }\{[(SiO_2+ZrO_2+SnO_2)/3],[(MgO+MnO+FeO)/3], \text{ or } Al_2O_3\}.$$

3. The glass of claim 1, wherein the composition of the components comprises:
greater than or equal to 0.0 mol. % and less than or equal to 3.0 mol. % $Bi_2O_3$,
a sum of $GeO_2+TeO_2$ greater than or equal to 0.0 mol. % and less than or equal to 3.0 mol. %, and
a sum of $Nb_2O_5+Ta_2O_5$ greater than or equal to 0.0 mol. % and less than or equal to 3.0 mol. %,
wherein the composition of the components is:
substantially free of $As_2O_3$;
substantially free of Cu, Fe, Cr and Co;
substantially free of fluorine;
substantially free of $P_2O_5$; and
substantially free of PbO.

4. The glass of claim 1, wherein the glass satisfies the conditions:

$$R_2O\text{-}Al_2O_3 [\text{mol. \%}] \geq 0.50.$$

5. The glass of claim 1, wherein the glass satisfies the conditions:

$$2.65 \geq (\text{Density at } 20° \text{ C. in g/cm}^3) \geq 2.8.$$

6. A glass comprising components, the glass having a composition of the components comprising:
greater than or equal to 25.0 mol. % and less than or equal to 75.0 mol. % $SiO_2$,
greater than or equal to 7.4 mol. % and less than or equal to 14.1 mol. % $Al_2O_3$,
greater than or equal to 0.0 mol. % and less than or equal to 10.0 mol. % $Na_2O$,
greater than or equal to 0.0 mol. % and less than or equal to 7.0 mol. % $Y_2O_3$,
greater than or equal to 0 mol. % and less than or equal to 4.95 mol. % $TiO_2$,
greater than or equal to 0.0 mol. % and less than or equal to 4.0 mol. % $B_2O_3$,
greater than or equal to 0.0 mol. % and less than or equal to 3.5 mol. % $Li_2O$,
greater than or equal to 5.0 mol. % and less than or equal to 55.0 mol. % total of divalent metal oxides (RO), and
a sum of $ZrO_2+HfO_2$ greater than or equal to 1.5 mol. % and less than or equal to 9.5 mol. %, and
wherein the composition of the components is substantially free of fluorine, and
wherein the glass satisfies the conditions:

$$(R_2O\text{-}Al_2O_3)[\text{mol. \%}] \leq 3.0,$$

$$(SiO_2\text{-}Al_2O_3\text{-}R_2O)[\text{mol. \%}] \leq 43.6, \text{ and}$$

$$(MgO/RO)[\text{mol. \%}] \geq 0.71,$$

where $R_2O$ is a total of monovalent metal oxides;
wherein the glass satisfies the conditions:

$$40 \leq P_{jb} \leq 90,$$

where $P_{jb}$ is a value of jeffbenite formation parameter, calculated from the glass composition in terms of mol. % of the components according to the following formula:

$$P_{jb}=7*\text{minimum of }\{[(SiO_2+ZrO_2+SnO_2)/3],[(MgO+MnO+FeO)/3], \text{ or } Al_2O_3\}.$$

7. The glass of claim 6, wherein the composition of the components comprises:
greater than or equal to 35.0 mol. % and less than or equal to 65.0 mol. % $SiO_2$,
greater than or equal to 10.0 mol. % and less than or equal to 45.0 mol. % MgO,
greater than or equal to 0.5 mol. % and less than or equal to 7.5 mol. % $ZrO_2$,
greater than or equal to 0.0 mol. % and less than or equal to 18.0 mol. % ($FeO+2*Fe_2O_3$),
greater than or equal to 0.0 mol. % and less than or equal to 15.0 mol. % $K_2O$,
greater than or equal to 0.0 mol. % and less than or equal to 12.0 mol. % ZnO,
greater than or equal to 0.0 mol. % and less than or equal to 10.0 mol. % FeO,
greater than or equal to 0.0 mol. % and less than or equal to 10.0 mol. % $La_2O_3$,
greater than or equal to 0.0 mol. % and less than or equal to 5.0 mol. % $Cs_2O$,
greater than or equal to 0.0 mol. % and less than or equal to 4.5 mol. % $TiO_2$,
greater than or equal to 0.0 mol. % and less than or equal to 3.0 mol. % $Li_2O$,
greater than or equal to 0.0 mol. % and less than or equal to 1.0 mol. % $P_2O_5$,
a sum of CaO+SrO greater than or equal to 0.0 mol. % and less than or equal to 3.0 mol. %, and
a sum of $MnO+MnO_2$ greater than or equal to 0.0 mol. % and less than or equal to 1.5 mol. %.

8. The glass of claim 6, wherein the composition of the components comprises:
greater than or equal to 0.0 mol. % and less than or equal to 3.0 mol. % $Bi_2O_3$,
a sum of $GeO_2+TeO_2$ greater than or equal to 0.0 mol. % and less than or equal to 3.0 mol. %, and
a sum of $Nb_2O_5+Ta_2O_5$ greater than or equal to 0.0 mol. % and less than or equal to 3.0 mol. %,
wherein the composition of the components is:
substantially free of $As_2O_3$;
substantially free of Cu, Fe, Cr and Co;
substantially free of $P_2O_5$; and
substantially free of PbO.

9. The glass of claim 6, wherein the glass satisfies the conditions:

$$2.65 \leq (\text{Density at } 20° \text{ C. in } g/cm^3) \leq 2.8.$$

10. A glass comprising a plurality of components, the glass having a composition of the components comprising
greater than or equal to 40.5. mol. % and less than or equal to 53.0 mol. % $SiO_2$,
greater than or equal to 23.0 mol. % and less than or equal to 43.0 mol. % MgO,
greater than or equal to 8.0 mol. % and less than or equal to 12.1 mol. % $Al_2O_3$,
greater than or equal to 0.0 mol. % and less than or equal to 18.0 mol. % ($FeO+2*Fe_2O_3$),
greater than or equal to 0.0 mol. % and less than or equal to 7.5 mol. % FeO,
greater than or equal to 0.0 mol. % and less than or equal to 7.0 mol. % $Li_2O$,
greater than or equal to 0.2 mol. % and less than or equal to 2.1 mol. % $TiO_2$,
greater than or equal to 0.0 mol. % and less than or equal to 0.9 mol. % $B_2O_3$,
greater than or equal to 0.0 at. % and less than or equal to 1.0 at. % F,
greater than or equal to 2.2 mol. % and less than or equal to 4.4 mol. % $ZrO_2$,
a sum of $ZrO_2+HfO_2+TiO_2$ greater than or equal to 1.5 mol. %,
a sum of $Na_2O+K_2O$ greater than or equal to 0.0 mol. % and less than or equal to 18.0 mol. % and a sum of CaO+SrO greater than or equal to 0 mol. % and less than or equal to 1.45 mol. %;
optionally comprising one or more components selected from monovalent metal oxides $R_2O$, divalent metal oxides RO, $MnO_2$, $P_2O_5$, $La_2O_3$ and $Y_2O_3$,
greater than or equal to 0.0 mol. % and less than or equal to 10.0 mol. % $K_2O$,
greater than or equal to 0.0 mol. % and less than or equal to 4.4 mol. % $Na_2O$,
greater than or equal to 0.0 mol. % and less than or equal to 1.5 mol. % SrO,
greater than or equal to 0.0 mol. % and less than or equal to 7.0 mol. % BaO,
greater than or equal to 0.0 at. % and less than or equal to 1.5 at. % $Y_2O_3$,
greater than or equal to 0.0 mol. % and less than or equal to 10.0 mol. % ZnO,
wherein the glass satisfies the conditions:

$$(SiO_2\text{-}Al_2O_3\text{-}R_2O)[mol.\%] \leq 38.5; \text{ and}$$

$$(MgO/RO)[mol.\%] \geq 0.725; \text{ and}$$

$$\{P_d\text{-}[3.38\text{-}0.016*(SiO_2\text{-}Al_2O_3\text{-}R_2O)]\} < 0.000,$$

where $P_d$ is a predicted value of density at room temperature, $d_{RT}[g/cm^3]$, calculated from the glass composition in terms of mol. % of the components according to the Formula:
$P_d$=2.887−[(0.0072823*$SiO_2$)+(0.0051002*MgO)−(0.0018062*$Al_2O_3$)+(0.025136*$ZrO_2$)−(0.0014332*$K_2O$)+(0.0092523*$TiO_2$)+(0.020819*ZnO)+(0.036644*BaO)+(0.017682*FeO)+(0.0071329*MnO)+(0.0091327*$MnO_2$)+(0.011077*CaO)+(0.024475*SrO)+(0.044972*$Cs_2O$)+(0.00053066*$Li_2O$)−(0.012312*$P_2O_5$)+(0.083043*$La_2O_3$)−(0.0074883*$B_2O_3$)+(0.059360*$Y_2O_3$)+(0.069507*PbO)+(0.056896*$HfO_2$)].

11. The glass of claim 10, wherein the glass satisfies the conditions:

$$\{d_{RT}\text{-}[3.38\text{-}0.016*(SiO_2\text{-}Al_2O_3\text{-}R_2O)]\} < 0.000,$$

where $d_{RT}$ [g/cm$^3$] is density at room temperature 200° C.

12. The glass claim 10, wherein the glass satisfies the conditions:

$$\{P_d\text{-}[3.35\text{-}0.016*(SiO_2\text{-}Al_2O_3\text{-}R_2O)]\} < 0.000.$$

13. The glass of claim 10, wherein the glass satisfies the conditions:

$$40 \leq P_{jb} \leq 90,$$

where $P_{jb}$ is a value calculated from the glass composition in terms of mol. % of the components according to the following formula:

$$P_{jb}=7*\text{minimum of }\{[(SiO_2+ZrO_2+SnO_2)/3],[(MgO+MnO+FeO)/3], \text{ or } Al_2O_3\}.$$

14. The glass of claim 10, wherein the composition of the components comprises
greater than or equal to 0.0 mol. % and less than or equal to 3.0 mol. % $Bi_2O_3$,
a sum of $GeO_2$+$TeO_2$ greater than or equal to 0.0 mol. % and less than or equal to 3.0 mol. %, and
a sum of $Nb_2O_5$+$Ta_2O_5$ greater than or equal to 0.0 mol. % and less than or equal to 3.0 mol. %, and
wherein the composition of the components is:
substantially free of $As_2O_3$;
substantially free of Cu, Fe, Cr and Co;
substantially free of fluorine;
substantially free of $P_2O_5$; and
substantially free of PbO.

15. The glass of claim 10, wherein the glass satisfies the conditions:

$$2.59 \leq P_d \leq 2.83,$$

where $P_d$ is predicted value of density at room temperature, $d_{RT}[g/cm^3]$, calculated from the glass composition in terms of mol. % of the components according to the Formula:
$P_d$=2.887−[(0.0072823*$SiO_2$)+(0.0051002*MgO)−(0.0018062*$Al_2O_3$)+(0.025136*$ZrO_2$)−(0.0014332*$K_2O$)+(0.0092523*$TiO_2$)+(0.020819*ZnO)+(0.036644*BaO)+(0.017682*FeO)+(0.0071329*MnO)+(0.0091327*$MnO_2$)+(0.011077*CaO)+(0.024475*SrO)+(0.044972*$Cs_2O$)+(0.00053066*$Li_2O$)−(0.012312*$P_2O_5$)+(0.083043*$La_2O_3$)−(0.0074883*$B_2O_3$)+(0.059360*$Y_2O_3$)+(0.069507*PbO)+(0.056896*$HfO_2$)].

\* \* \* \* \*

UNITED STATES PATENT AND TRADEMARK OFFICE
CERTIFICATE OF CORRECTION

PATENT NO. : 11,964,907 B2
APPLICATION NO. : 18/113198
DATED : April 23, 2024
INVENTOR(S) : Beall et al.

Page 1 of 1

It is certified that error appears in the above-identified patent and that said Letters Patent is hereby corrected as shown below:

In the Claims

Claim 11; Line 41; "Temperature 200° C." correct to say "Temperature 20° C."

Signed and Sealed this
Twenty-first Day of January, 2025

Coke Morgan Stewart
*Acting Director of the United States Patent and Trademark Office*